United States Patent
Riemens

(10) Patent No.: US 10,679,373 B2
(45) Date of Patent: Jun. 9, 2020

(54) DUAL MODE DEPTH ESTIMATOR

(71) Applicant: ULTRA-D COÖPERATIEF U.A., Eindhoven (NL)

(72) Inventor: Abraham Karel Riemens, Eersel (NL)

(73) Assignee: ULTRA-D COÖPERATIEF U.A., Eindhoven (NL)

( * ) Notice: Subject to any disclaimer, the term of this patent is extended or adjusted under 35 U.S.C. 154(b) by 47 days.

(21) Appl. No.: 16/095,530

(22) PCT Filed: Apr. 20, 2017

(86) PCT No.: PCT/EP2017/059344
§ 371 (c)(1),
(2) Date: Oct. 22, 2018

(87) PCT Pub. No.: WO2017/182548
PCT Pub. Date: Oct. 26, 2017

(65) Prior Publication Data
US 2019/0130593 A1 May 2, 2019

(30) Foreign Application Priority Data

Apr. 21, 2016 (EP) .................................... 16166353

(51) Int. Cl.
*G06T 7/593* (2017.01)
*H04N 13/128* (2018.01)
(Continued)

(52) U.S. Cl.
CPC ............... *G06T 7/593* (2017.01); *G06T 1/60* (2013.01); *H04N 13/106* (2018.05);
(Continued)

(58) Field of Classification Search
CPC .......... H04N 13/161; H04N 2013/0081; G06T 7/593
See application file for complete search history.

(56) References Cited

U.S. PATENT DOCUMENTS 8,537,201 B2 * 9/2013 Choi .................... H04N 13/194
348/43
9,083,959 B2 * 7/2015 Ha ............................. G06T 3/40
(Continued)

FOREIGN PATENT DOCUMENTS

EP 2268047 A2 12/2010
EP 2916290 A1 9/2015

OTHER PUBLICATIONS

NPL Google Search-1; 2019; (Year: 2019).*
(Continued)

*Primary Examiner* — Luis Perez-Fuentes
(74) *Attorney, Agent, or Firm* — Kenealy Vaidya LLP

(57) ABSTRACT

A system-on-chip is provided which is configured for real-time depth estimation of video data. The system-on-chip includes a monoscopic depth estimator configured to perform monoscopic depth estimation from monoscopic-type video data, and a stereoscopic depth estimator configured to perform stereoscopic depth estimation from stereoscopic-type video data. The system-on-chip is reconfigurable to perform either the monoscopic depth estimation or the stereoscopic depth estimation on the basis of configuration data defining a selected depth estimation mode. Both depth estimators include shared circuits which are instantiated in hardware and reconfigurable to account for differences in the functionality of the circuit in each depth estimator.

18 Claims, 20 Drawing Sheets

(51) Int. Cl.

| | |
|---|---|
| *H04N 13/106* | (2018.01) |
| *G06T 1/60* | (2006.01) |
| *H04N 13/15* | (2018.01) |
| *H04N 13/161* | (2018.01) |
| *H04N 13/00* | (2018.01) |
| *H04N 13/261* | (2018.01) |
| *H04N 13/221* | (2018.01) |
| *H04N 13/122* | (2018.01) |

(52) U.S. Cl.
CPC .......... *H04N 13/128* (2018.05); *H04N 13/15* (2018.05); *H04N 13/161* (2018.05); *G06T 2207/10012* (2013.01); *G06T 2207/10021* (2013.01); *G06T 2207/10024* (2013.01); *G06T 2207/20016* (2013.01); *G06T 2207/20028* (2013.01); *H04N 13/122* (2018.05); *H04N 13/221* (2018.05); *H04N 13/261* (2018.05); *H04N 2013/0081* (2013.01); *H04N 2213/003* (2013.01); *H04N 2213/005* (2013.01)

(56) References Cited

U.S. PATENT DOCUMENTS

| | | | | |
|---|---|---|---|---|
| 9,137,512 | B2* | 9/2015 | Baik | H04N 13/139 |
| 9,414,048 | B2* | 8/2016 | Karsch | H04N 13/261 |
| 9,420,310 | B2* | 8/2016 | Tian | H04N 21/2365 |
| 10,404,961 | B2* | 9/2019 | Chan | H04N 13/167 |
| 10,425,634 | B2* | 9/2019 | Hefeeda | G06T 7/55 |
| 2008/0137989 | A1* | 6/2008 | Ng | G06K 9/20 382/285 |
| 2014/0232820 | A1 | 8/2014 | Ha et al. | |

OTHER PUBLICATIONS

NPL Google Search-2; 2019 (Year: 209).*
3D capturing with monoscopic camera; Galabov; 2014; (Year: 2014).*
Quality Index for Stereo Images by Adding and Subtracting; Yang; 2015; (Year: 2015).*
Realtime stereo vision using semi-global matching disparity; in FPGA architecture; 2010 (Year: 2010).*
Stereo Conversion of Monoscopic Video by the Transformation of Disparity; Kim; 1998 (Year: 1998).*
Synthesis of high-resolution 3D stereo image pair from monoscopic image; Kim; 1998 (Year: 1998).*
Heng, T. K., et al., "Implementation and optimization of software depth estimation for arm," 3DTV-Conference: The True Vision—Capture, Transmission and Display of 3D Video (3DTV-CON), Oct. 15, 2012, IEEE, XP032275870, pp. 1-4.
International Search Report and Written Opinion for PCT Patent App. No. PCT/EP2017/059344 (dated Jun. 21, 2017).
International Preliminary Report on Patentability for PCT Patent App. No. PCT/EP2017/059344 (dated Jul. 19, 2018).
Tsai, S.-F., et al., "A Real-Time 1080p 2D-to-3D Video Conversion System," IEEE International Conference on Consumer Electronics (ICCE) 2011, pp. 803-804.
Banz, C., et al., "Real-Time Stereo Vision System using Semi-Global Matching Disparity Estimation: Architecture and FPGA-Implementation," International Conference on Embedded Computer Systems: Architectures, Modeling and Simulation (SAMOS) 2010, IEEE, pp. 93-101.
Ding, J., et al., "Real-time stereo vision system using adaptive weight cost aggregation approach," EURASIP Journal on Image and Video Processing 2011;20:pp. 1-19.
Akin, A., et al., "A Hardware-Oriented Dynamically Adaptive Disparity Estimation Algorithm and its Real-Time Hardware," Proceedings of the 23rd ACM International Conference on Great Lakes Symposium on VLSI (GLSVLSI), May 2013, Paris, France, pp. 155-160.
Zhang, X., et al., "A SoPC design of a real-time high-definition stereo matching algorithm based on SAD," Computer Modelling & New Technologies 2014;18(4):7-14.
Honegger, D., et al., "Real-time and Low Latency Embedded Computer Vision Hardware Based on a Combination of FPGA and Mobile CPU," RSJ International Conference on Intelligent Robots and Systems, IEEE, 2014, Chicago, IL, pp. 4930-4935.

* cited by examiner

Use case A

Use case B

Fig. 7 Use case C

Use case L

Use case A

Use case B

| Usecase | Component | Remap | O1x1 | O2x2 | O4x4 | O8x8 |
|---|---|---|---|---|---|---|
| A,B | RY | on | on | on | off | off |
| | LY | off | off | on | on | on |
| | LU | off | off | on | on | off |
| | LV | off | on | off | on | off |
| C | RY | on | off | off | off | off |
| | LY | off | off | on | on | off |
| | LU | off | off | on | on | on |
| | LV | off | off | on | on | off |
| K | Y | off | off | on | on | off |
| | U | off | off | on | off | off |
| | V | off | off | on | off | off |

Fig. 14

| Usecase | DUP2 | DUP1 | UV8x8 | UV4x4 | UV2x2 |
|---|---|---|---|---|---|
| A | on | on | on | on | on |
| B | on | on | on | on | off |
| C | on | on | on | on | off |
| K | off | on | n/a | on | on |

Fig. 15

Use case A

Fig. 17 Use case A*

| Usecase | Component | Remap | O1x1 | O2x2 | O4x4 | O8x8 |
|---|---|---|---|---|---|---|
| A | RY | on | on | on | off | off |
| | LY | off | off | on | on | on |
| | LU | off | off | on | on | off |
| | LV | off | off | on | off | off |
| A* | RY | on | on | on | off | on |
| | LY | off | off | on | on | off |
| | LU | off | on | on | on | off |
| | LV | off | on | on | on | off |

Fig. 18

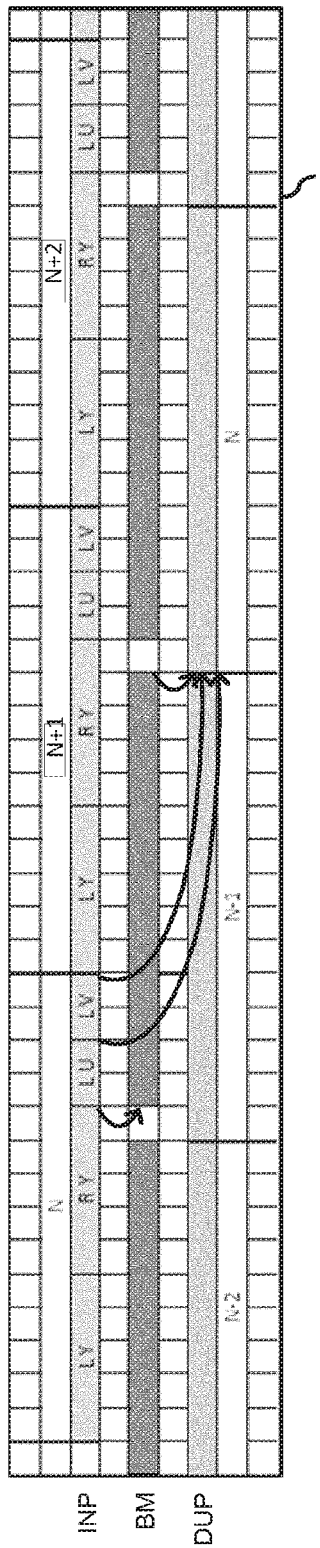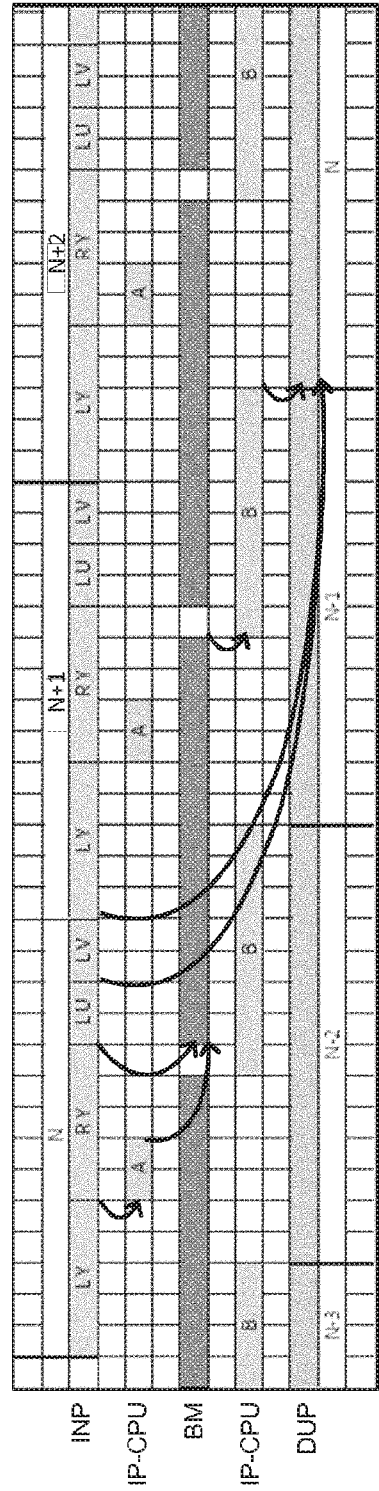
Fig. 19
Fig. 20

DUAL MODE DEPTH ESTIMATOR

CROSS REFERENCE TO RELATED APPLICATION(S)

This application is a National Phase Filing under 35 C.F.R. § 371 of and claims priority to PCT Patent Application No. PCT/EP2017/059344, filed on Apr. 20, 2017, which claims the priority benefit under 35 U.S.C. § 119 of European Patent Application No. 16166353.9, filed on Apr. 21, 2016, the contents of each of which are hereby incorporated in their entireties by reference.

BACKGROUND

Some embodiments relate to a system-on-chip configured for real-time depth estimation, with the system-on-chip including a plurality of circuits and a memory interface for enabling direct memory access to a shared memory.

Increasingly, display devices such as televisions, digital photo frames, tablets and smartphones include 3D displays to provide a user with a perception of depth when viewing content on such a device. For that purpose, such 3D displays may, either by themselves or together with glasses worn by the user, provide the user with different images in each eye so as to provide the user a perception of depth based on stereoscopy.

In media distribution, two types of video content are currently widely available:

1. Stereoscopic video content, including or consisting of a sequence of left- and right-images pairs (commonly referred to as "stereo video" or "3D video")
2. Monoscopic video content, including or consisting of a sequence of single images (commonly referred to as "2D video")

SUMMARY

It may be beneficial to convert either type of video data to the so-termed image+depth format, in which depth information is provided by a depth map which may include depth values, disparity values and/or parallactic shift values, with all of the values being indicative of the distance that objects within the image have towards the camera. Such a format has proven to be advantageous, e.g., to enable depth adjustment after content creation, to address autostereoscopic multi-view displays with more than two views, etc.

For converting monoscopic and stereoscopic video data to an image+depth format, depth estimation may be used. However, the type of depth estimation is different for stereoscopic than for monoscopic video data. Namely, in case of stereoscopic video content, stereopsis is available as a binocular depth cue for depth estimation, whereas in case of monoscopic video content, only monoscopic depth cues are available, including but not limited to depth from motion, elevation, curvilinear perspective, defocus blur, etc. As such, different depth estimation is needed for monoscopic and stereoscopic video data.

However, once converted into the image+depth format, any subsequent processing can be the same, including view rendering, depth adjustment, etc.

It may be beneficial to provide a resource effective system-on-chip for real-time depth estimation of both stereoscopic and monoscopic video data.

A first aspect of some embodiments provides a system-on-chip configured for real-time depth estimation of video data, the system-on-chip including:

a monoscopic depth estimator configured to perform monoscopic depth estimation from monoscopic-type video data;
a stereoscopic depth estimator configured to perform stereoscopic depth estimation from stereoscopic-type video data;
a memory interface for enabling direct memory access to a shared memory;
wherein the system-on-chip is reconfigurable to perform either the monoscopic depth estimation or the stereoscopic depth estimation on the basis of configuration data defining the selected depth estimation mode, wherein the monoscopic depth estimator and the stereoscopic depth estimator include:
 a reconfigurable shared input processing circuit instantiated in hardware and reconfigurable by the configuration data to:
  generate an hierarchy of downscaled images for each input image of the video data by spatially downscaling the input image in accordance with a plurality of downscale factors, wherein the input processing circuit is configurable by the configuration data to select a different subset of the hierarchy of downscaled images to be output for the stereoscopic depth estimation than for the monoscopic depth estimation to obtain use-case specific downscaled video data, and
  store the use-case specific downscaled video data in the shared memory;
 each separately, a depth estimator core circuit instantiated in hardware and configured to:
  access the video data or the use-case specific downscaled video data,
  estimate depth data from the accessed video data, the depth data having a spatial resolution lower than the spatial resolution of the video data, and
  store the depth data in the shared memory;
 a reconfigurable shared depth upscaling circuit instantiated in hardware and reconfigurable by the configuration data to:
  access the depth data and the use-case specific downscaled video data, and
  upscale the depth data in successive steps using the use-case specific downscaled video data, wherein the depth upscaling circuit is configurable by the configuration data to use different successive steps for the stereoscopic depth estimation than for the monoscopic depth estimation in accordance with the selected depth estimation mode.

Incoming video data is either stereoscopic or monoscopic and thus both depth estimation use-cases, e.g., depth estimation from stereoscopic video data and depth estimation from monoscopic video data, are mutually exclusive. Normally, an implementation of a depth estimator for stereoscopic video data and a depth estimator for monoscopic video data would result in dedicated (function-specific) circuits, thus establishing disjunctive circuits which are only alternatingly active. In accordance with some embodiments, the system includes reconfigurable shared circuits. The term 'shared' circuit refers to a circuit which is used by both depth estimators and may only be instantiated once in hardware.

Nevertheless, the shared circuits can be differently configured by configuration data defining the selected depth estimation mode to account for differences in the functionality of the shared circuit in each depth estimator. As one of the shared reconfigurable circuits, an input processing circuit is provided which differently spatially downscales the video data in accordance with the selected depth estimation mode. In particular, the input processing circuit is arranged to generate a hierarchy of downscaled images by downscaling the input image in accordance with a plurality of downscale factors. For example, the input image may be repeatedly downscaled by a factor of 2. The input processing circuit is configurable on the basis of the configuration data to, for each different use-case including the aforementioned monoscopic depth estimation and stereoscopic depth estimation, output a different subset of downscaled images. Accordingly, the input processing circuit can accommodate different requirements in terms of resolution of images which may be required for monoscopic depth estimation and stereoscopic depth estimation, and in particular, by other circuits involved in the depth estimation.

One example of such circuits are the depth estimator core circuits which are separately instantiated in hardware. Both depth estimator core circuits may use the downscaled video data to estimate depth, and may have different requirements with respect to the resolution of the downscaled video data and, in accordance with an optional aspect, also with respect to which components of the video data are provided. The input processing circuit is thus arranged to accommodate such different input requirements by providing use-case specific downscaled video data to the currently active depth estimator core circuit.

Another example is the depth upscaling circuit, which is provided as a shared circuit and may thus be instantiated once in hardware, and which differently upscales the depth data in accordance with the selected depth estimation mode. In particular, the upscaling may be performed in successive steps, wherein the successive steps are different for monoscopic depth estimation and stereoscopic depth estimation. A non-limiting reason for this may be that the depth data having a different spatial resolution depending on whether it was estimated by the monoscopic depth estimator or the stereoscopic depth estimator. Similar to the input processing circuit, the depth upscaling circuit is configurable by the configuration data to accommodate such different scaling requirements and thus only has to be instantiated once in hardware. Since the upscaling may use downscaled images to upscale the depth data, e.g., using image-adaptive upscaling, and in particular use a different subset of downscaled images in each use-case, the use-case specific downscaled video data is used as input as generated by the input processing circuit for the specific use-case.

As such, there is substantial amount of hardware sharing or hardware re-use between the two depth estimators, resulting in a resource-effective system-on-chip for monoscopic and stereoscopic depth estimation.

Optionally, the depth estimator core circuit of the monoscopic depth estimator implements a joint bilateral filter which, when applied to an image of the video data or the use-case specific downscaled video data, provides a depth map as output. Joint bilateral filters have been found to be well-suited for depth estimation from monoscopic video data, as they may be used to adapt a generic depth profile to actual image contents. Since such bilateral filters may use downscaled image data as input and generate downscaled depth data as output, there exists substantial functional overlap with stereo depth estimators based on block matching, which may also use downscaled image data as input and generate downscaled depth data as output.

Optionally, the depth estimator core circuit of the stereoscopic depth estimator implements a block matcher which, when applied to a stereo image pair of the video data or the use-case specific downscaled video data, provides a disparity map as output.

BRIEF DESCRIPTION OF THE FIGURES

These and other aspects of some embodiments are apparent from and will be elucidated with reference to the embodiments described hereinafter. In the drawings.

FIGS. 14 and 15 provide summaries relating to the use-cases of FIGS. 10-13;

FIGS. 16-18 illustrate the buffer management of the video data;

FIG. 19 shows a schedule for real-time conversion of stereoscopic video data;

FIG. 20 shows another schedule for real-time conversion of stereoscopic video data;

Figure 1:
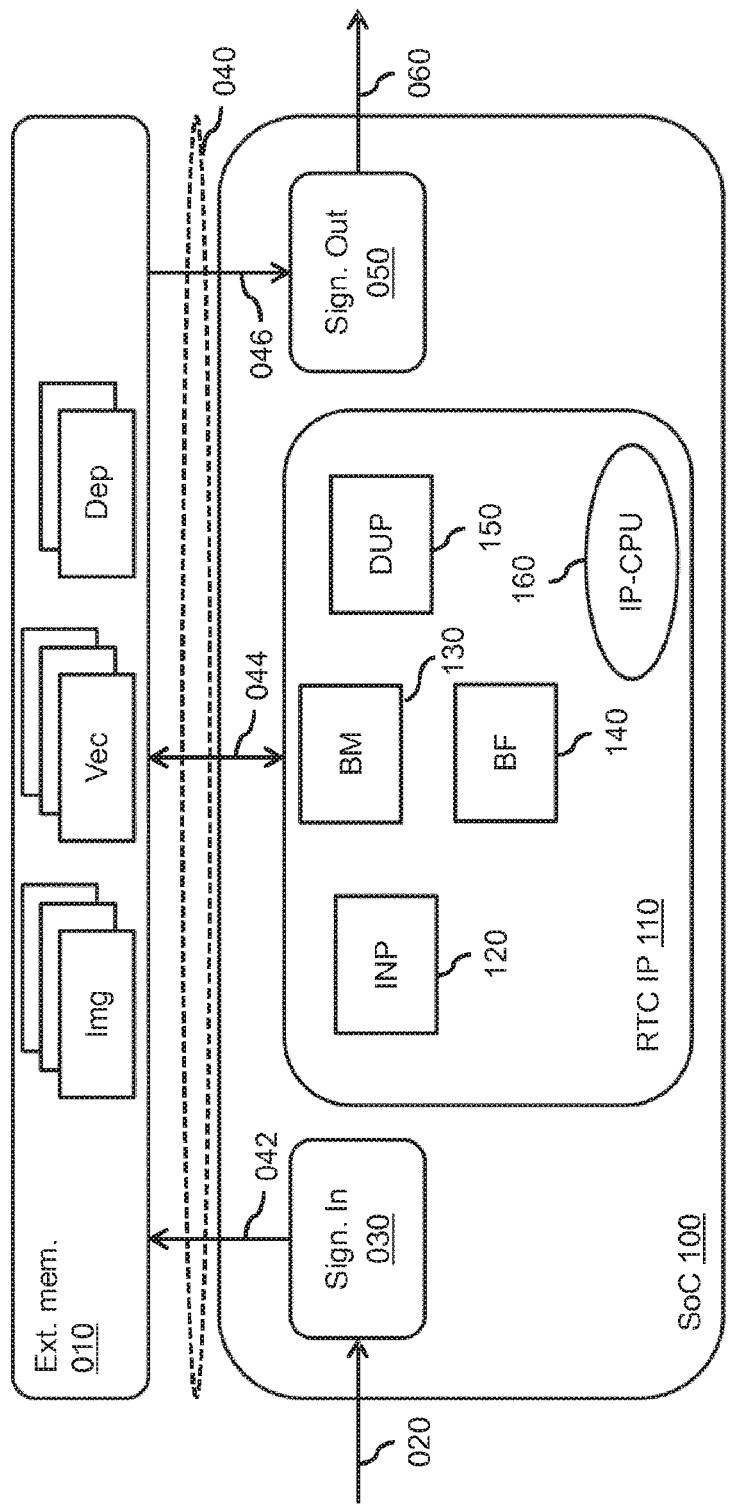
FIG. 1 shows an overview of a system-on-chip with an (external) shared memory, with the system-on-chip including a real-time conversion (RTC) IP block.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMBERS

The following list of reference numbers is provided for facilitating the interpretation of the drawings and shall not be construed as limiting the claims.

010 external shared memory
020 video data
030 signal input
040-046 data communication with external shared memory
050 signal output
060 output signal
100 system-on-chip
110 real-time conversion IP block
120 input processing circuit
130 block matching circuit
140 joint bilateral filter
150 depth upscaling circuit
160 embedded CPU core
200 monoscopic depth estimator
210 stereoscopic depth estimator
300 basic schedule for real-time conversion of stereoscopic video data 310 advanced schedule for real-time conversion of stereoscopic video data
320 basic schedule for real-time conversion of monoscopic video
330 advanced schedule for real-time conversion of monoscopic video

DETAILED DESCRIPTION OF EXEMPLARY EMBODIMENTS

FIG. 1 shows an overview of a system-on-chip 100 (labeled in FIG. 1 and henceforth also referred to as 'SoC') with an external shared memory 010 (labeled 'Ext. mem') with the SoC 100 including a real-time conversion IP block 110 (labeled and henceforth also referred to as 'RTC IP block'). Here, the term 'IP block' refers to an implementation of a reusable unit of logic, cell, or chip layout design, also referred to as Semiconductor Intellectual Property core in the art of electronic design. The RTC IP block 110 is shown to include an input processing circuit 120 (labeled 'INP'), a block matching circuit 130 (labeled 'BM'), a joint bilateral filter circuit 140 (labeled 'BF'), a depth upscaling circuit 150 (labeled 'DUP') and an embedded CPU core 160 (labeled 'IP CPU').

The SoC 100 is shown to interface 040 with the external memory 010 in the following manner. Video data 020 including a plurality of images is received by a signal input 030 (labeled 'Sign. In') of the SoC 100 and stored in the external memory 010 via data communication 042. The signal input 030 may, but does not need to, perform input processing, such as color space conversion (e.g., RGB to YUV), chroma subsampling, de-multiplexing into a planar format (e.g., for storage in planar buffers in the external memory 010), etc. The stored images are then processed by the RTC IP block 110, via data communication 044, with the RTC IP block 110 being configured to estimate the depth represented by the content of the images, thereby yielding as output at least depth information and possibly intermediate data which is stored in the external memory 010. The images and depth information are then read out by a signal output 050 of the SoC 100 (labeled 'Sign. Out') via data communication 046 and composed into an output signal 060.

The processing of the RTC IP block 110 may be the following: the input processing circuit 120 may spatially downscale the video data to obtain downscaled video data, and store the downscaled video data in the external memory. A depth estimator core circuit, being either the block matching circuit 130 or the joint bilateral filter circuit 140 and further discussed with reference to FIG. 2, may access the downscaled video data, estimate depth from the downscaled video data, thereby obtaining depth data having a spatial resolution lower than the spatial resolution of the video data, and store the depth data in the external memory. The depth upscaling circuit 150 may access the depth data and the downscaled video data, and upscale the depth data using the downscaled video data.

Figure 2:
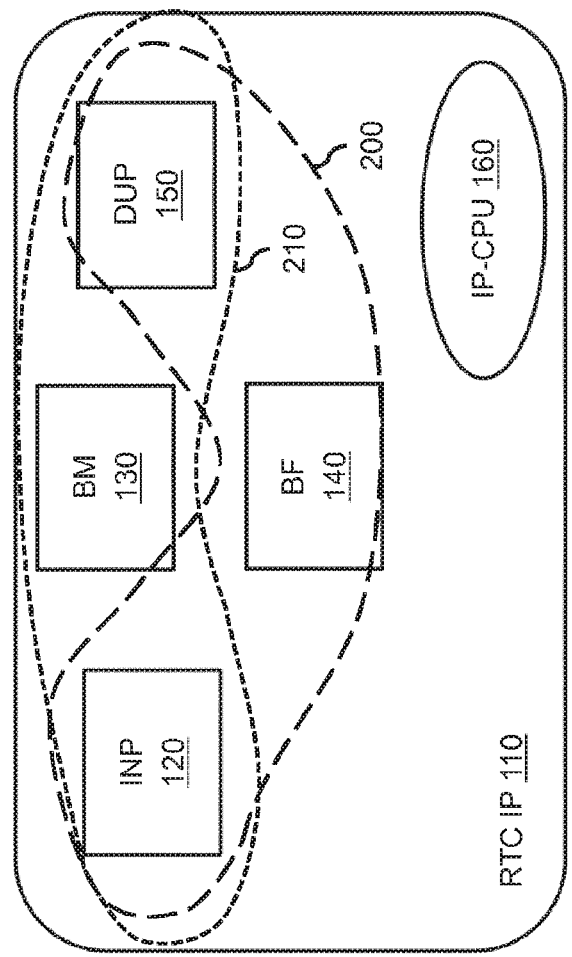
FIG. 2 illustrates a configuration of the RTC IP block for either depth estimation of stereoscopic video data or monoscopic video data.

The RTC IP block 110 may be reconfigurable in two different modes, namely a monoscopic (also simply called '2D') depth estimation mode and a stereoscopic (also simply called 'stereo') depth estimation mode. As such, the system-on-chip may be reconfigurable to perform either monoscopic depth estimation or stereoscopic depth estimation. FIG. 2 schematically illustrates the circuits involved in each mode of the RTC IP block 110, indicating the monoscopic depth estimator 200 and the stereoscopic depth estimator 210 respectively by a dashed outline encompassing the circuits representing each respective depth estimator. Namely, the monoscopic depth estimator 200 includes the input processing circuit 120, the joint bilateral filter circuit 140 and the depth upscaling circuit 150, whereas the stereoscopic depth estimator 210 includes the input processing circuit 120, the block matching circuit 130 and the depth upscaling circuit 150.

A separate depth estimator core circuit is therefore provided for estimating depth from monoscopic-type video data and from stereoscopic-type video data, while both depth estimators 200, 210 share the input processing circuit 120 and depth upscaling circuit 150. As also illustrated in FIG. 2, the depth estimator core circuit for monoscopic depth estimation may be a joint bilateral filter circuit 140, whereas the depth estimator core circuit for the stereoscopic depth estimation may be a block matching circuit 130. The input processing circuit 120 and the depth upscaling circuit 150 may each be reconfigurable to process either the monoscopic-type video data or the stereoscopic-type video data as thus be shared by the monoscopic depth estimator and the stereoscopic depth estimator.

It has been recognized that both depth estimators are used in mutually exclusive situations, namely the video data being either monoscopic video data or stereoscopic video data. This recognition is used as a basis for the RTC IP block 110, in which there is a substantial amount of hardware sharing or hardware re-use between the two depth estimators of the RTC IP block 110, resulting in a cost-effective IP block suitable for both monoscopic and stereoscopic video data. In particular, such re-use is obtained by providing reconfigurable shared circuits which are reconfigurable by configuration data. The configuration data may include parameters defining functionality of each circuit for each of the depth estimation modes. Each shared circuit may include parameterizable inputs, scalers and outputs. As such, the term 'reconfiguration' may refer to the input, scalers and outputs being configured in accordance with the parameters of the configuration data.

It is noted that the RTC IP block 110 may be reconfigured into either the 2D mode or the stereo mode on the basis of configuration data indicative of a selected depth estimation mode. In particular, such configuration data may include configuration data components for reconfiguring the input processing circuit 120 and the depth upscaling circuit 150 in accordance with the selected depth estimation mode, as will be further described with further reference to FIGS. 3 and 4. The data components may be stored in different parts of the RTC IP block 110, e.g., in different registers or internal memories; the configuration data may thus be distributed rather than be constituted by, e.g., a single block of data. The configuration data may originate from different sources, including but not limited to end-user (menu) settings, or may be automatically derived from properties of input signal 020. A non-limiting example is if the input is HDMI, then a so-termed frame-packed mode may be detected at the input and serve to select/activate the stereo estimator.

An example of a schedule of operations for each of the depth estimators of the RTC IP block 110 will be discussed with further reference to FIGS. 19-22.

Figure 3:
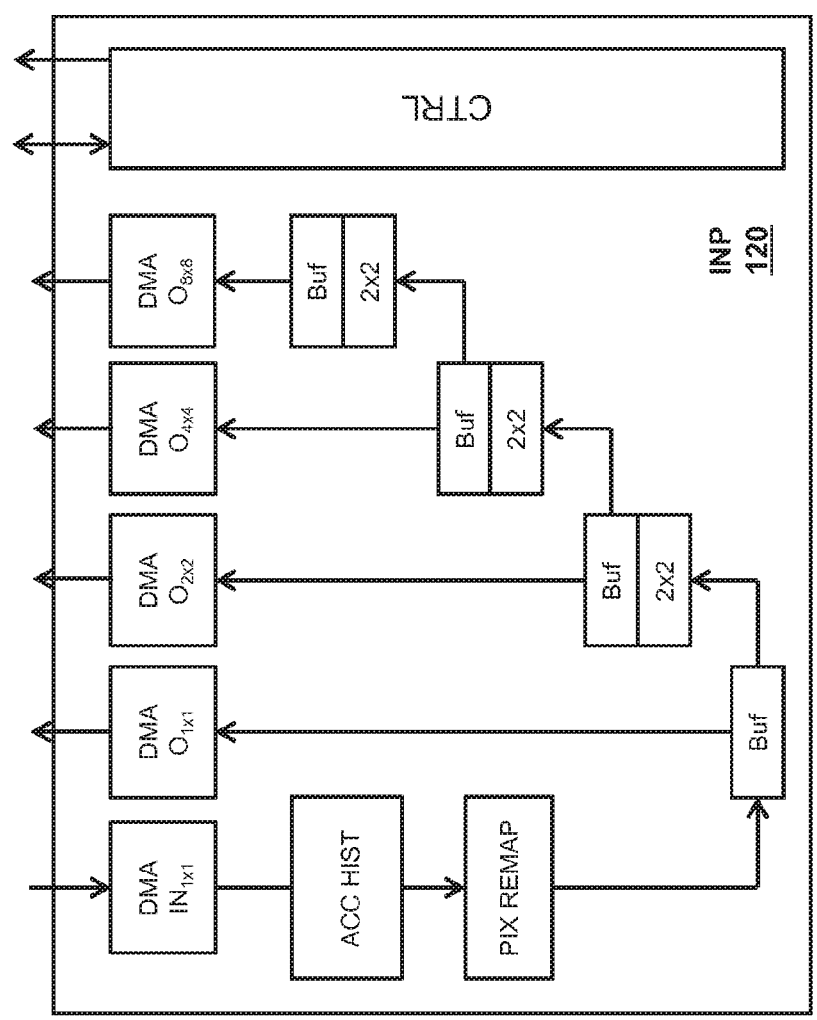
FIG. 3 shows the input processing circuit of the RTC IP block.

FIG. 3 shows more details of a specific embodiment of the input processing circuit 120 of the RTC IP block. The input processing circuit 120 may be configured to spatially downscale the video data to obtain downscaled video data, and store the downscaled video data in the external memory. For that purpose, the input processing circuit 120 may include hardware which can be configured for use in 2D mode or stereo mode and for use of Y and U/V components with reduced configuration and therefore with increased re-use of the hardware in the block. This contributes to a cost-effective and versatile solution.

In case of stereo mode, all outputs are enabled, which means that an input image, obtained via the DMA $IN_{1\times 1}$ block, is scaled down by factors of 2×2, 4×4 and 8×8, with the numbers indicating the downscaling along the horizontal and vertical dimension, respectively. Here, a '2×2' block indicates a scaling circuit downscaling the input by 2×2, and the respective output being indicated by a DMA OUT block. In case of 2D depth estimation, the 8×8 output may be disabled, since this output is not used. For the stereoscopic depth estimator, it has been found that the left- and right-hand images sometimes suffer from color differences. The input processing circuit 120 may contain features to correct such differences. Specifically, the histogram of both images may be accumulated by a circuit labeled 'ACC HIST'. The IP CPU (not shown in FIG. 3) may then configure a pixel remapping table to correct the color differences, which may be applied by a circuit labelled 'PIX REMAP' to the right-hand image. It is noted that the left-hand image is advantageously or preferably used as reference image, as it is normally used as viewfinder in a stereo camera. It is further noted that histogram accumulation and pixel remapping may be disabled in the 2D mode, i.e., when using the 2D depth estimator, meaning that the respective circuits may be configurable to be used or not depending on the selected depth estimation mode.

It is further noted that the input processing circuit 120 may be configured to also downscale the U and V color components of the video data. It may be assumed that these components are stored in a planar fashion, so each component is stored in its own buffer. In a typical case, the input signal may employ chrominance subsampling 4:2:0, which means that the input U and V buffers are already pre-downscaled to the 2×2 Y resolution. Such 2×2 downscaled U or V buffer may be processed by the same hardware block. In this case, an input U or V buffer at 2×2 may be downscaled to 4×4 and output via DMA O2×2 (here, the prefix 'O' stands for 'Output'), to 8×8 and output via DMA O4×4, and to 16×16 and output via DMA O8×8. Moreover, the O8×8 output is typically disabled for the stereo mode. For the 2D mode, the O4×4 output may be disabled for the chrominance components.

Figure 4:
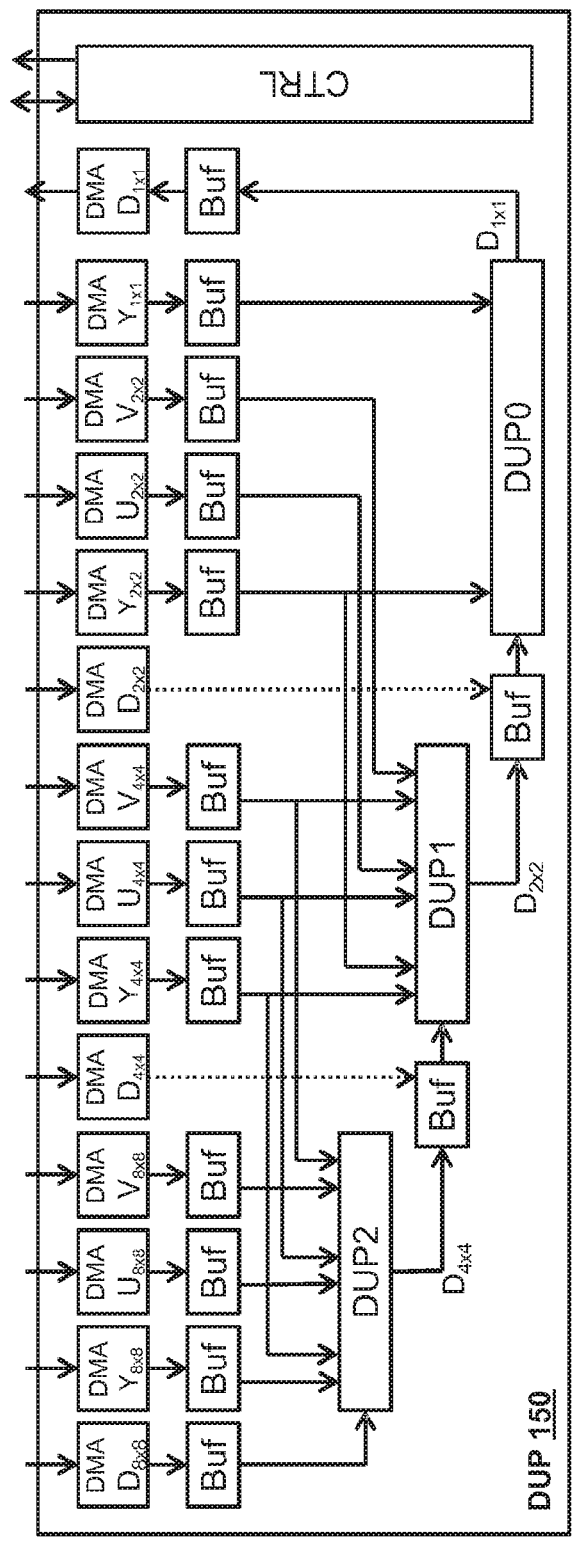
FIG. 4 shows the depth upscaling (DUP) of the RTC IP block.

FIG. 4 shows the depth upscaling (DUP) circuit 150 of the RTC IP block, which is also reconfigurable on the basis of the configuration data, thereby enabling its use in both the 2D mode and the stereo mode. In a specific example, the depth upscaling circuit 150 may, in its upscaling, employ a technique described in the paper "*Multistep joint bilateral depth upsampling*", by Riemens et al., Proc. SPIE 7257, Visual Communications and Image Processing 2009, Jan. 19, 2009, namely a joint bilateral filtering technique in which the upsampling (i.e., upscaling) filter uses samples from both the high-resolution and the low-resolution images in the so-termed 'range term' of the bilateral filter. The upsampling may performed in multiple stages, refining the resolution by a factor of 2×2 at each stage. In particular, the depth upscaling circuit may be configured for a 3-step upsampling (using DUP2, DUP1 and DUP0) or for a 2-step upsampling (using only DUP1 and DUP0). This 3-step upsampling may involve the D4×4 DMA unit (here, the prefix 'D' stands for 'Depth') and a multiplexer determining the source of the data written in the local buffer containing D4×4 data. Further, to assist in testing, there is shown to be an optional D2×2 input behaving similar to the D4×4 input. As shown in FIG. 4, the DUP2 and DUP1 upsample steps may be configured to use U and V image data so as to obtain an improved detection of image edges. For these steps, the coefficient weight in the bilateral filters may be determined by Y, U and V components. The U and V components are optional to allow for quality-of-service: not providing these image buffers results in a lower bandwidth use of the depth upscaling circuit, but at the cost of a reduction in quality of the edge preservation behavior of the bilateral filter. It is further noted that the last upsample step DUP0 may use only the Y component. In practice, most signal sources have been distributed via media distribution networks, and therefore were typically subjected to a chrominance subsampling of 4:2:0. In these cases, there is no useful information in the full-resolution chrominance signals, even if such a signal were to be available.

It is noted that there are different reasons for both the downscaling of the input data and the upsampling of the output depth data between both depth estimators.

In case of the stereo depth estimator, the block matcher may operate on a certain block size. The choice of the block size is typically an important algorithmic design parameter: when using very small sizes, blocks are insufficient unique, and thus the block matcher has difficulty to recognize similar image content, whereas when using very large block sizes, the resulting depth field has a very coarse structure. A good balance is found in using a block size of, e.g., 8×8 pixels. This results in a disparity vector for each 8×8 block with respect to the input resolution, and thus also a depth value at each 8×8 pixel block. Since a depth value at each pixel is desired at the output, e.g., for view rendering, this calls for upsampling from the 8×8 grid to a 1×1 grid. The depth upscaling circuit provides this upsampling functionality. In case the stereo estimator runs only on the input resolution, there is no need for downscaling the video input images for the block matching circuit. It is noted, however, that the depth upscaling circuit may perform a step-wise upsampling in successive 2×2 steps. Each of these steps may benefit from the use of the image data at both the lower—as well as the higher spatial resolution. Therefore, downscaled image at 8×8, at 4×4 and at 2×2 resolution may be used. These downscaled images may be created by the input processing circuit. In case hierarchical block matching is employed by the stereo depth estimator, downscaled input images may be required for the "higher" hierarchical levels; so in this case, the downscaled input images may be reused for different purposes.

In case of the monoscopic depth estimator, the inventors have realized that it is advantageous to run the bilateral filter circuit on a lower resolution than the input resolution. Even in the case of a fast bilateral filter implementation, this reduces the resource usage of the system. The inventors have recognized that bilateral filtering on 4×4 downscaled image data provides sufficient good results. This causes the output depth map of the bilateral filter to be on a 4×4 downscaled grid compared to the input resolution. In order to have the bilateral filter operate on a 4×4 downscaled image, the input needs to be downscaled, and the depth upscaling circuit needs to upsample the 4×4 depth map to a 1×1 grid.

FIGS. 5-18 illustrate various design considerations behind the input processing circuit and the depth upscaling circuit as described in this specification.

Figure 5:
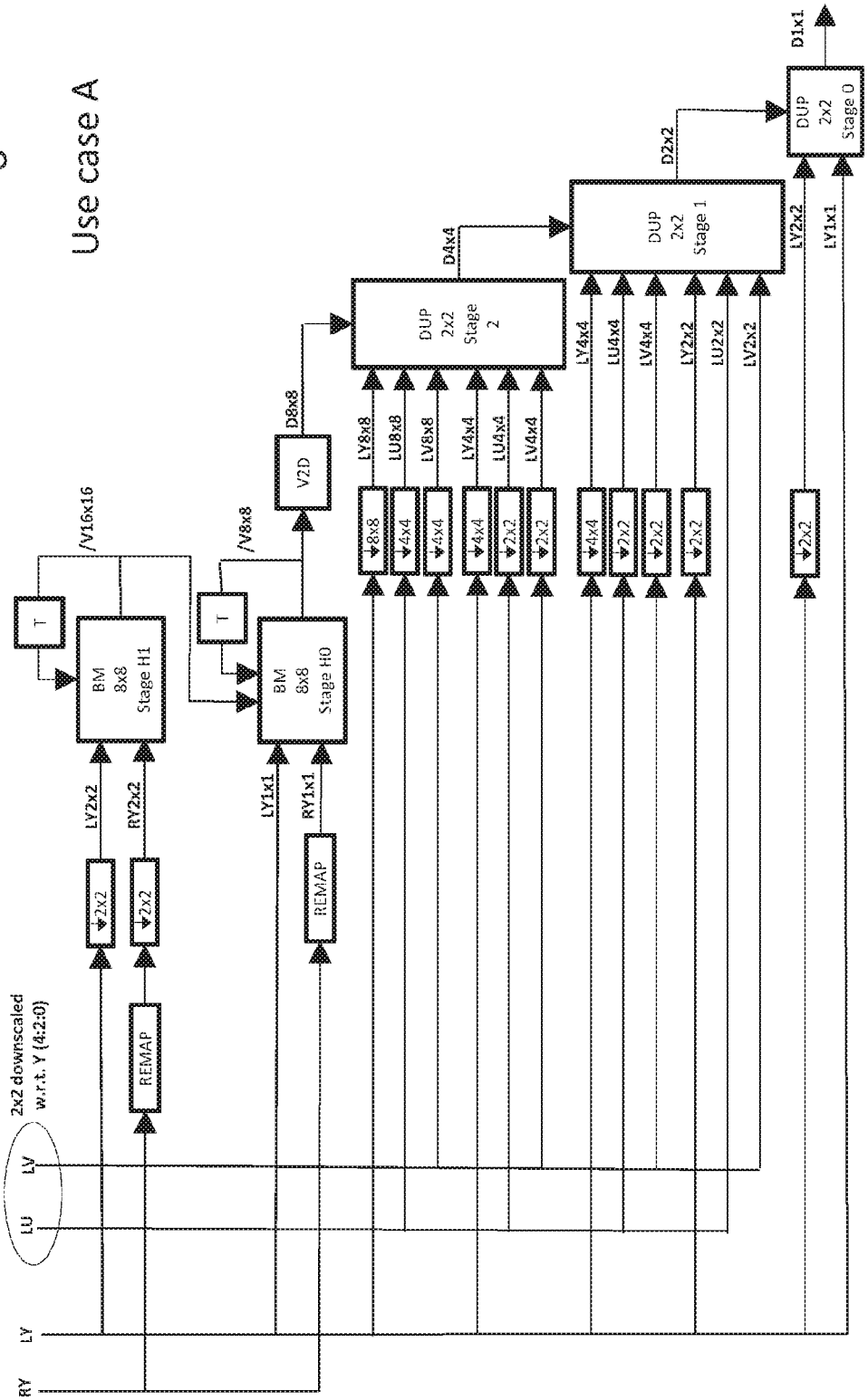
FIGS. 5-7 illustrate various stereoscopic depth estimation uses-cases.
Figure 6:
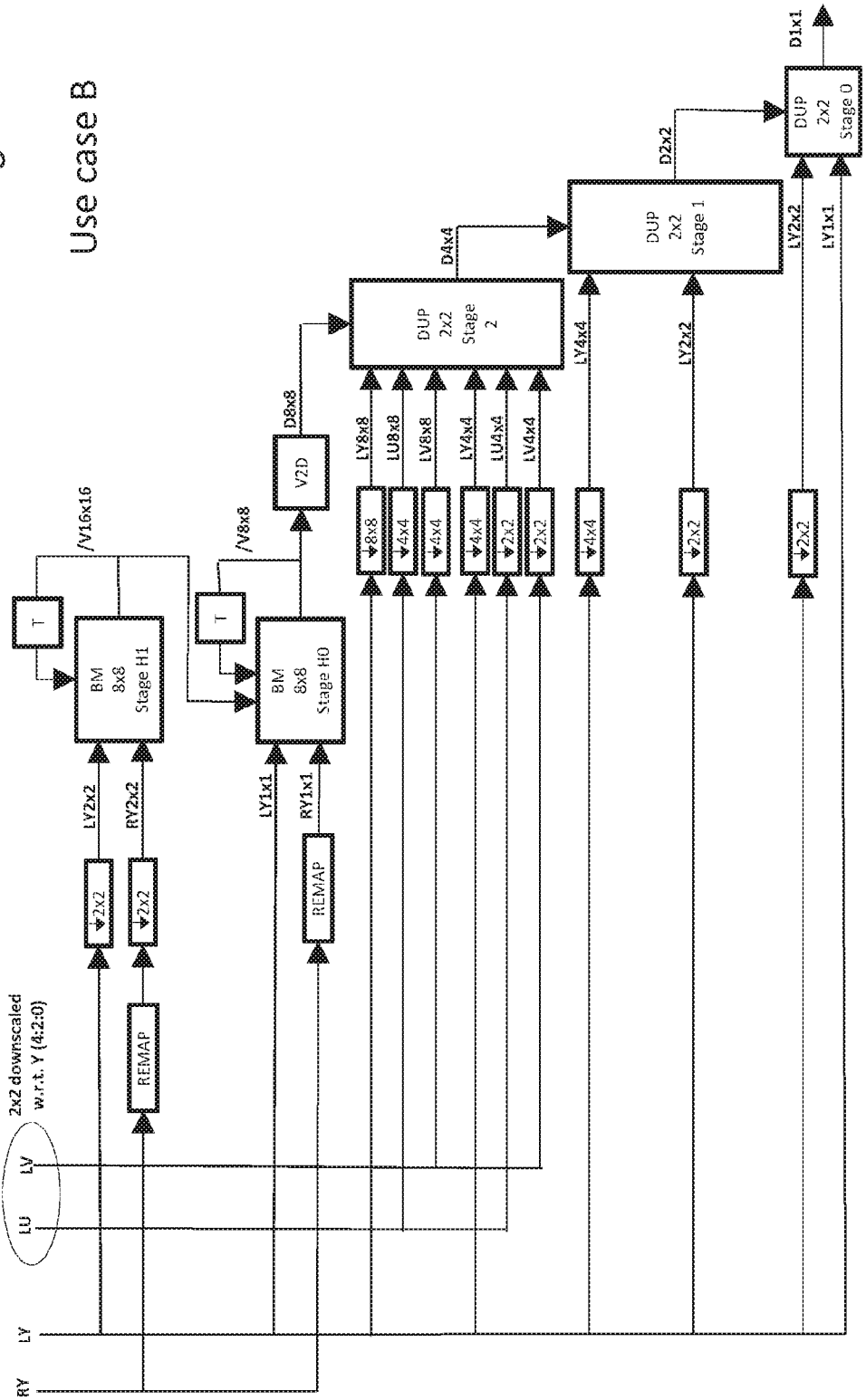
Figure 7:
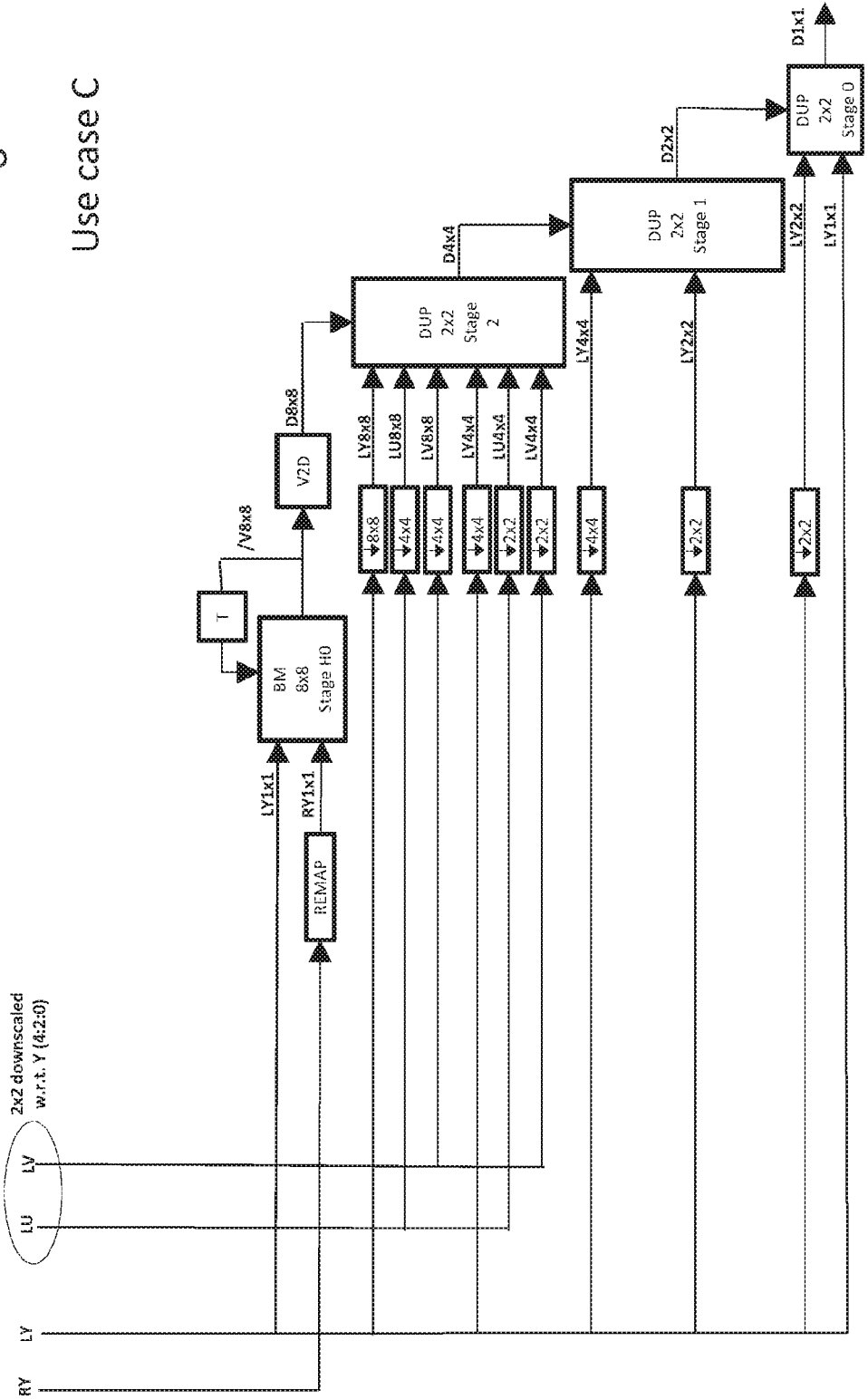

FIGS. 5-7 illustrate the stereo depth estimation using a block matcher BM which provides an 8×8 depth map as output, which is then upscaled to 1×1 resolution in a series of upscaling steps. Here and in the following Figures, "N" denotes a vector field.

FIGS. 5-7 differ in that they show different use-cases for stereo depth estimation: FIG. 5 shows a use-case A in which hierarchical block matching is employed. FIG. 6 shows a first Quality of Service (QoS) use-case B, in which stage 1 of the depth upscaling uses only the (left image) Y component rather than also using (left image) U and V components as in use-case A, which reduces the quality of output but also reduces bandwidth usage into the DUP block and lowers power consumption. FIG. 7 shows another QoS use-case C. In this use-case, no hierarchical block estimation is used, which reduces the bandwidth into the block matcher and lowers power consumption. For all of these use-cases, the data flows are shown, with video data of RY, LY, LU and LV being obtained for each functional block separately, and depending on the requirements of the block, being downscaled beforehand. As such. FIGS. 5-7 illustrate the requirements of each functional block in terms of input data.

Figure 8:
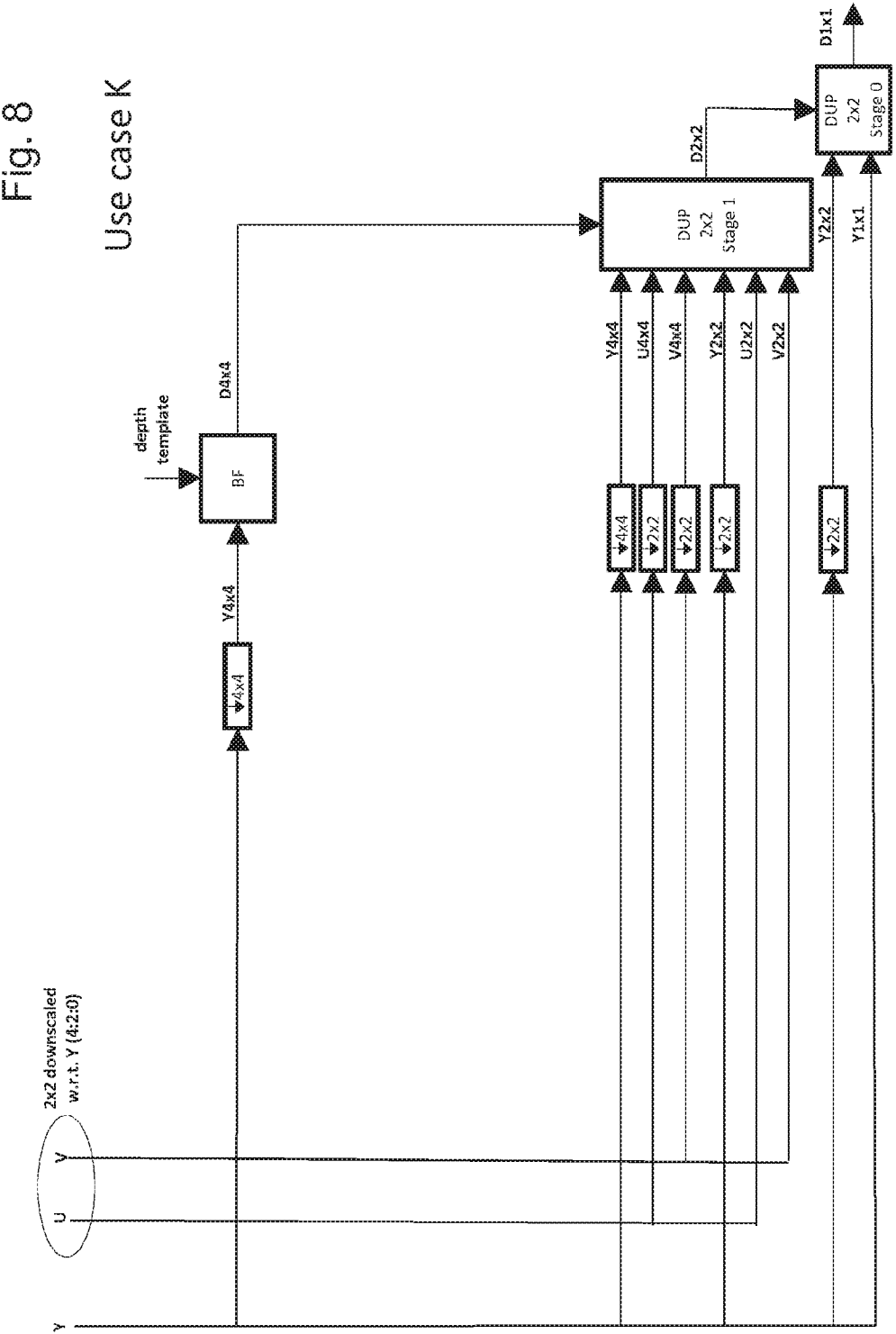
FIGS. 8 and 9 illustrate various monoscopic depth estimation use-cases.
Figure 9:
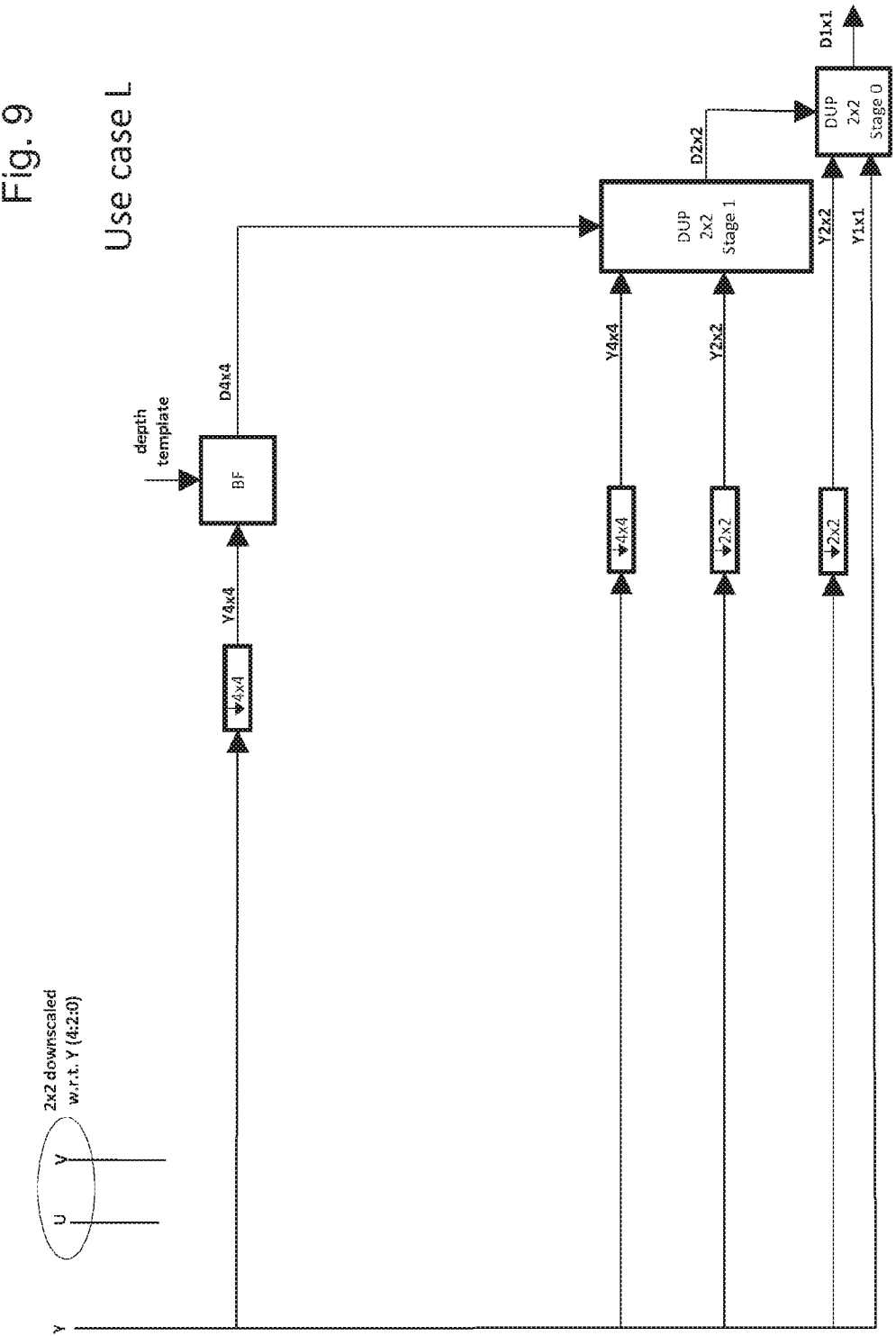

FIGS. 8 and 9 are similar to FIGS. 5-7 but now show two different use-cases K, L for the monoscopic depth estimator. Here, a joint bilateral filter is used which is applied to a depth template, e.g., a slant, using the 4×4 downscaled Y component as range term. The upscaling is again performed in multiple stages, with the FIG. 8 use-case K using the luminance data component Y as well as chrominance components U, V of the video data to perform the upscaling, while the FIG. 9 use-case L only uses the luminance data component Y, thereby reducing bandwidth usage into the DUP block and lowering power consumption.

Figure 10:
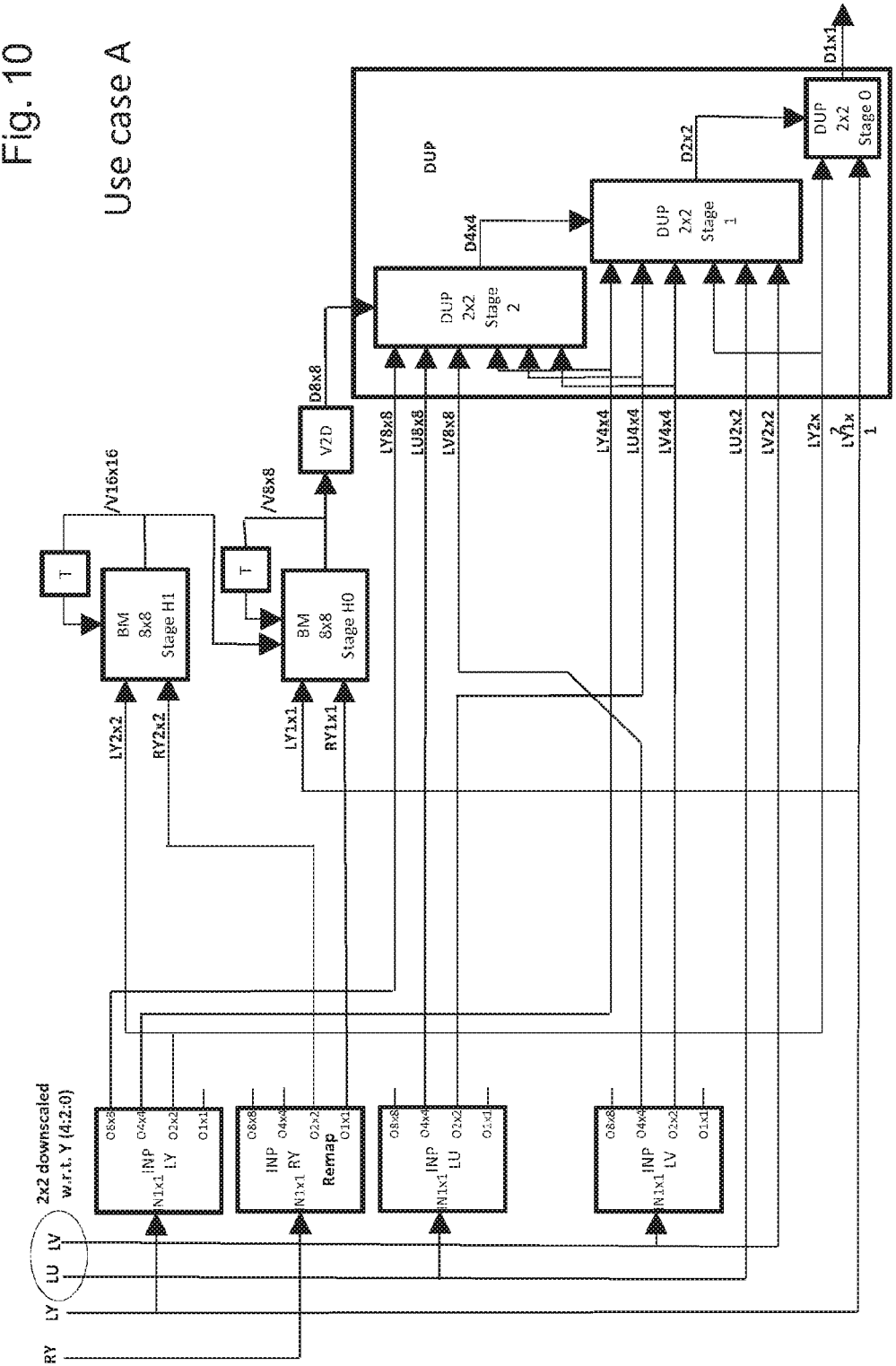
FIGS. 10-13 correspond to the use-cases of FIGS. 5-8 but now depicted using the input processing circuit as described with reference to FIG. 3.
Figure 11:
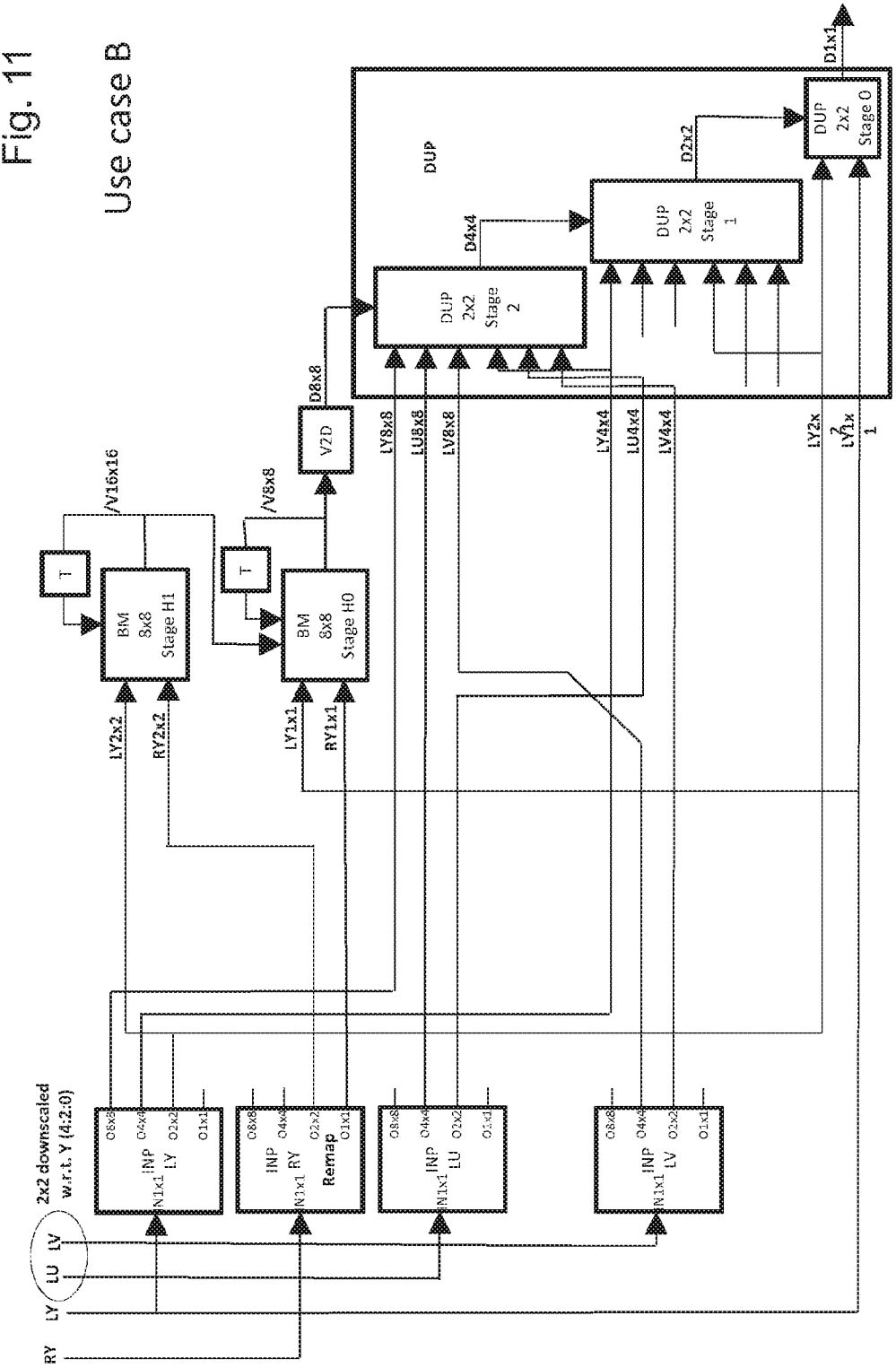
Figure 12:
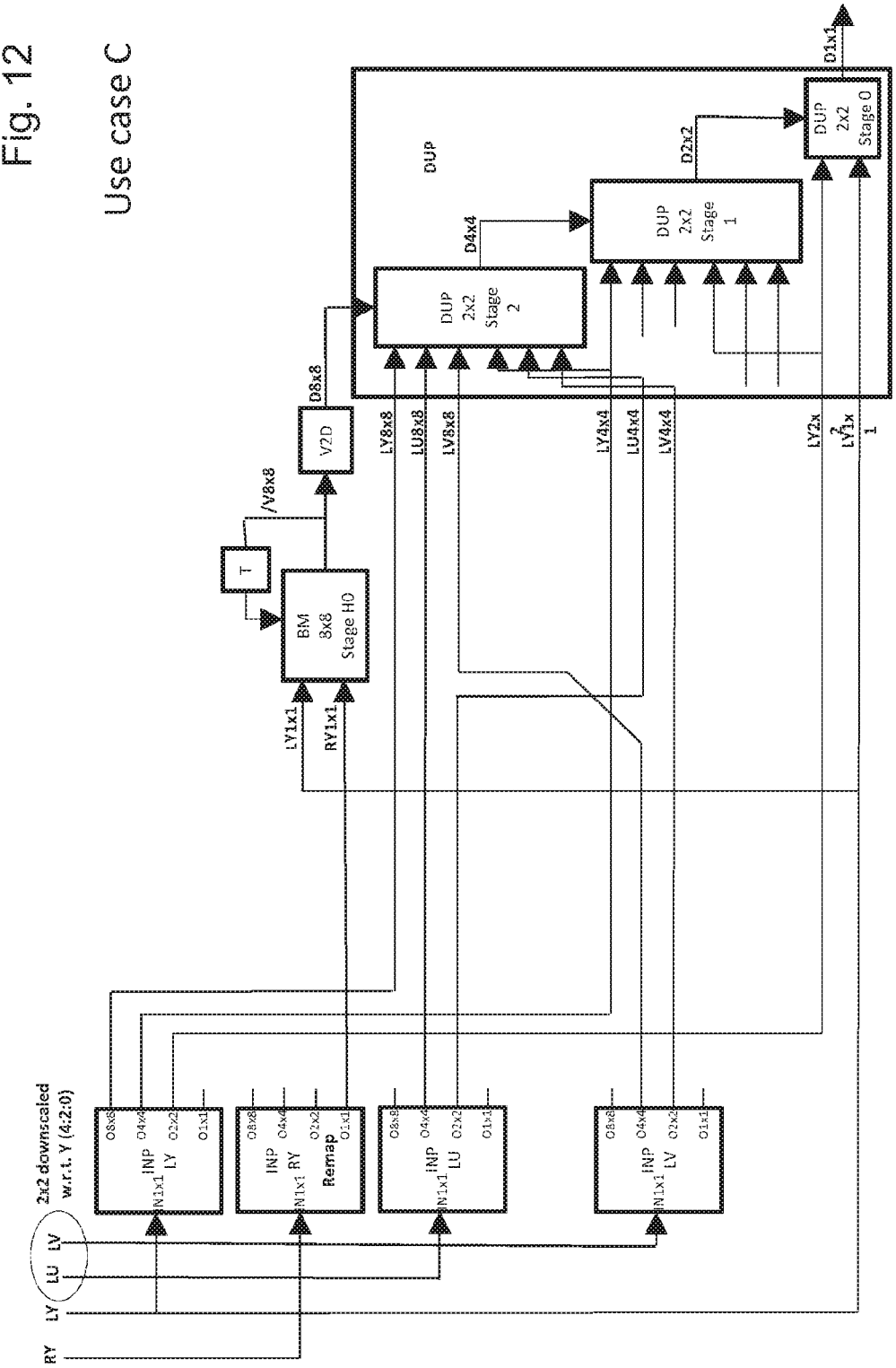
Figure 13:
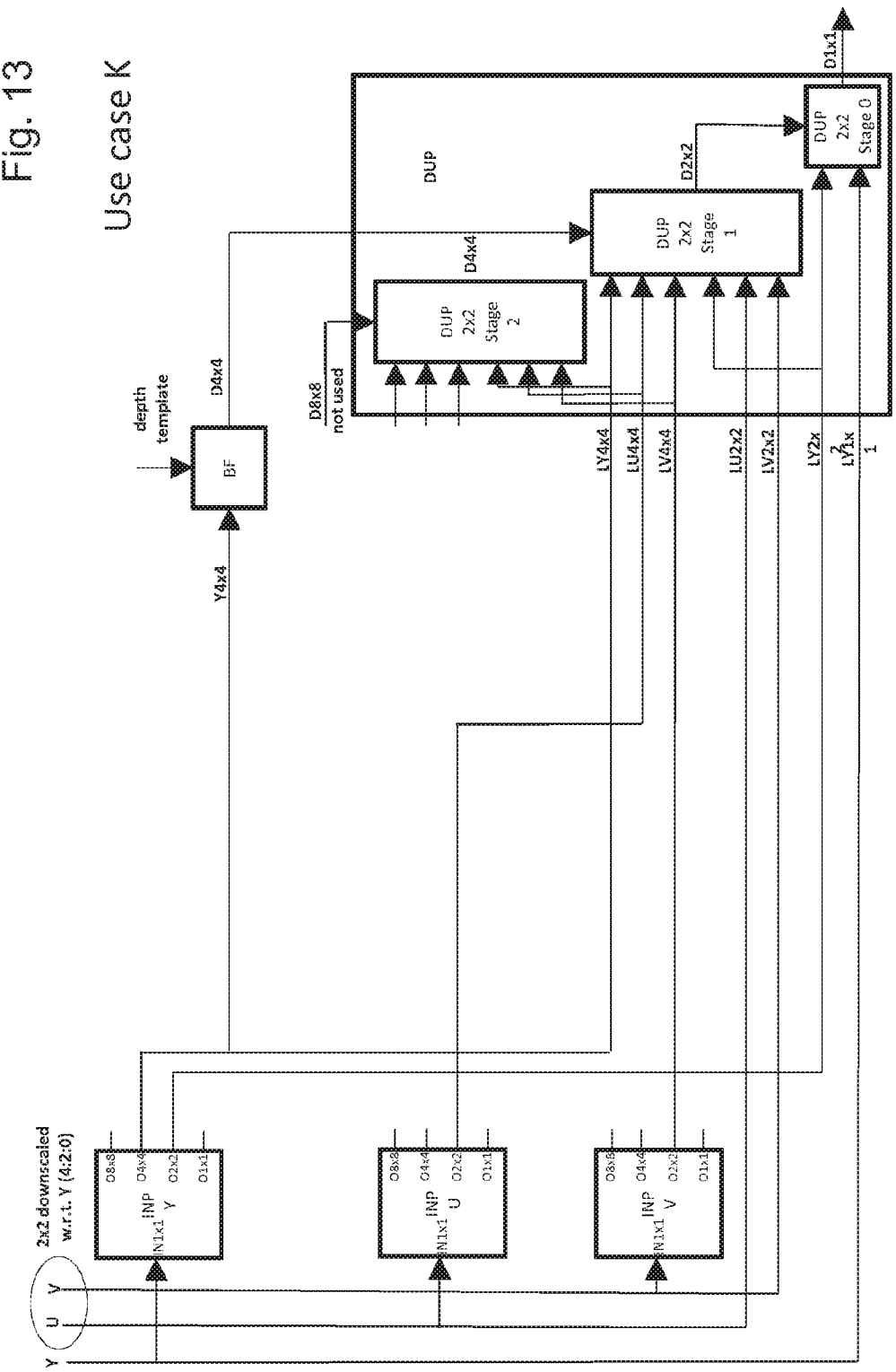

When mutually comparing the different use-cases for each depth estimator, as well as comparing the stereoscopic uses-cases to the monoscopic use-cases, it can be seen that there is significant overlap between the input requirements of the different functional blocks. Accordingly, the inventors have devised the input processing circuit as being a hardware circuit which may only need to be instantiated once in hardware, but which can accommodate all these use-cases. Further, the inventors have also devised the depth upscaling process circuit as a hardware circuit DUP which can accommodate all these use-cases. The result is shown in FIGS. 10-12 for the use-cases A, B, C, and in FIG. 13 for the use-case K (the corresponding Figure for use-case L has been omitted due to its similarity to FIG. 13, omitting only the chrominance inputs to the DUP circuit).

In each of these Figures, the input processing circuit is shown to receive 1×1 video data as input, being either unscaled Y video data or in the case of U, V being already downscaled by 2×2 with respect to Y due to 4:2:0 formatting. The input processing circuit is further shown to include selectable outputs for 8×8, 4×4 and 2×2 downscaled versions thereof, as well as a non-downscaled '1×1' output. This design corresponds to that of the input processing circuit previously described with reference to FIG. 3. To efficiently handle the processing of the different data components, e.g., LY, RY, LU, LV for stereoscopic depth estimation and Y, U, V for monoscopic depth estimation, the input processing circuit may be instantiated once in hardware but configured to time-sequentially process each of the data components. As such, although shown four times (FIG. 10-12) or 3 times (FIG. 13), a single instantiation in hardware may be used. When comparing FIGS. 10-12 to FIGS. 5-7 and FIG. 13 to FIG. 8, it can be seen that the number of input scalers is significantly reduced due to the reconfigurability of the input processing circuit to accommodate the different use-cases.

FIG. 14 summaries the configuration of the input processing circuit for each of the use-cases, indicating which outputs are selected for which use-case and for each data component within the respective use-case. Here, 'remap' refers to the histogram-based adjustment referred to as pixel remapping and previously explained with reference to FIG. 3.

FIG. 15 summaries the configuration of the depth upscaling circuit for each of the use-cases, indicating for each use-case which upscaling stages and U, V inputs are used.

Figure 16:
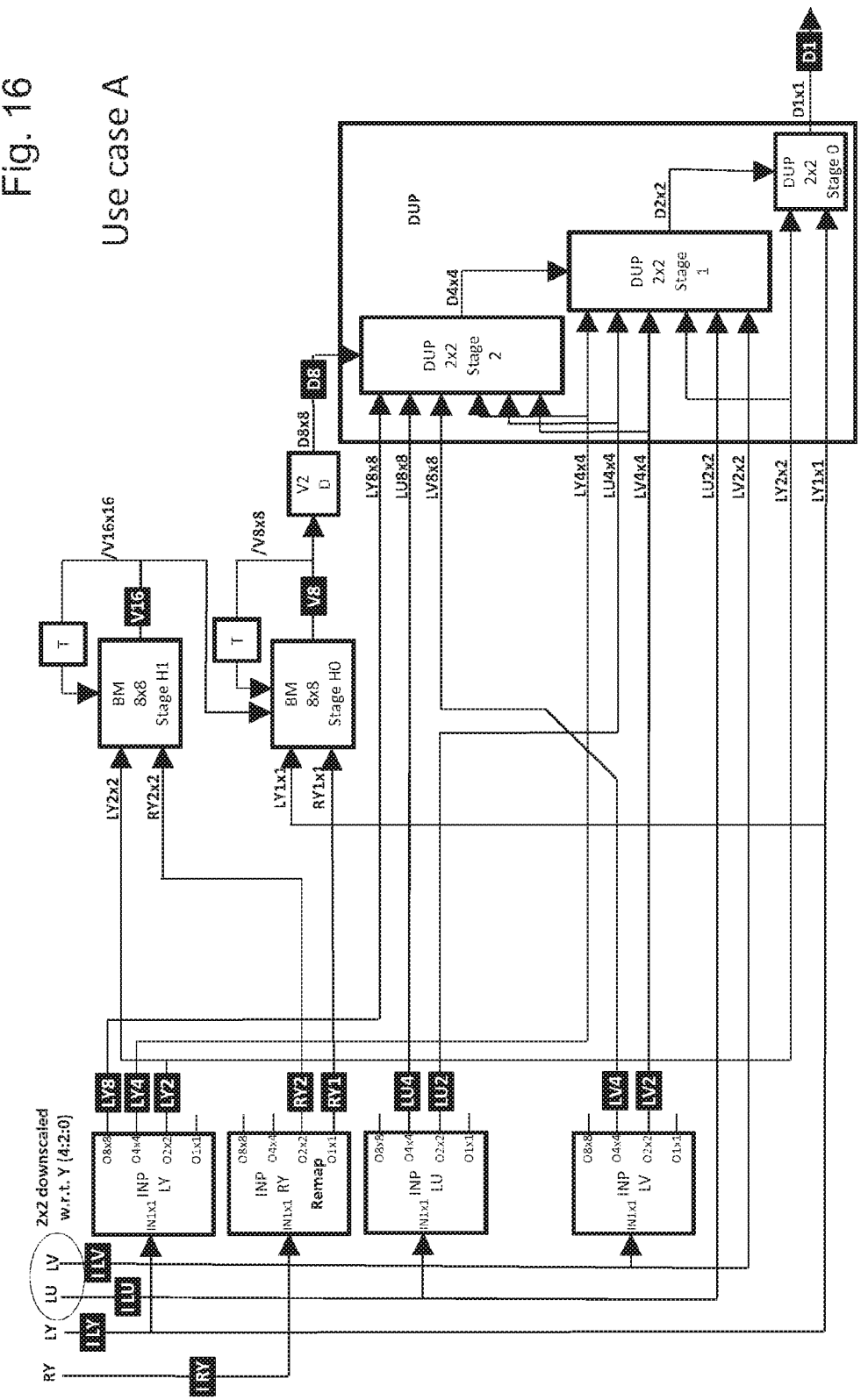

FIG. 16 illustrates why, in addition to allowing a histogram-adjustment of stereo images using the remap feature, the input processing circuit is designed to have a 1×1 output, i.e., outputting the video data without additional scaling. For that purpose, FIG. 16 shows, for the use case A of FIG. 5, how buffering is performed if the unscaled video data would be obtained by each functional block directly from the input buffer (with the exception of the IRY component, which is pixel remapped by the input processing circuit and thus necessarily needs to be obtained from the output of the input processing circuit). In this example, buffers are allocated in the shared memory for the input data components IRY (input right Y), ILY (input left Y), ILU (input left U) and ILY (input left Y). Such buffers would typically be allocated externally from the RTC IP block itself, e.g., by a microprocessor or controller in the system-on-chip. As internally allocated buffers, buffers for LY8 (left Y, being in this case 8×8 downscaled), LY4, LY2, RY2, RY1, LU4, LU2, LV4 and LV2 are allocated in the shared memory. These buffers are shown in FIG. 16 in black having white text.

One may recognize two different buffer usages in FIG. 16. One usage are the I/O buffers: the input buffers ILY, ILU, ILV and IRY are written with image data outside of the RTC IP block (this operation is not shown in FIG. 16), and the data is read in the RTC IP block; analogously, the output buffer D1 is written by the RTC IP block and read outside of the RTC IP block (again not shown). The other usage concerns the internal buffers, which are both written and read only internally by the RTC IP block components. In a real-time system, there is typically a pre-allocated pool of available memory. Buffers can be taken from the pool, used for a particular purpose and when not in use anymore, they may be returned to the pool. Each of these buffers typically needs to be managed properly, that is: the system may keep track of each buffer, where is it used and how long it is still in use. The duration a buffer is in use is called the lifetime of the buffer. In view of design partitioning, internal buffers are typically managed by a system component that has the detailed knowledge of the workings of the RTC IP block components and its use-cases (e.g. QoS settings as explained use case A, B, C). The I/O buffers however, are shared with the "outside" of the RTC IP block, and therefore need to be managed by a more global system component that has information about the overall video data flow in the system.

A disadvantage of the scenario shown in FIG. 16 is that the input buffers for, in this particular example, ILY, ILU and ILV are not only used by the input processing circuit for downscaling, but in the case of ILY also later by the block matcher, and in the case of ILU and ILV, also by the depth upscaling circuit in stage 0. This complicates design partitioning and separation of concerns, since the input buffers may need to have a prolonged lifetime which depends on the particular use-case for which the RTC IP block components are configured and which lifetime thus may need to be managed outside of the RTC IP block.

Figure 17:
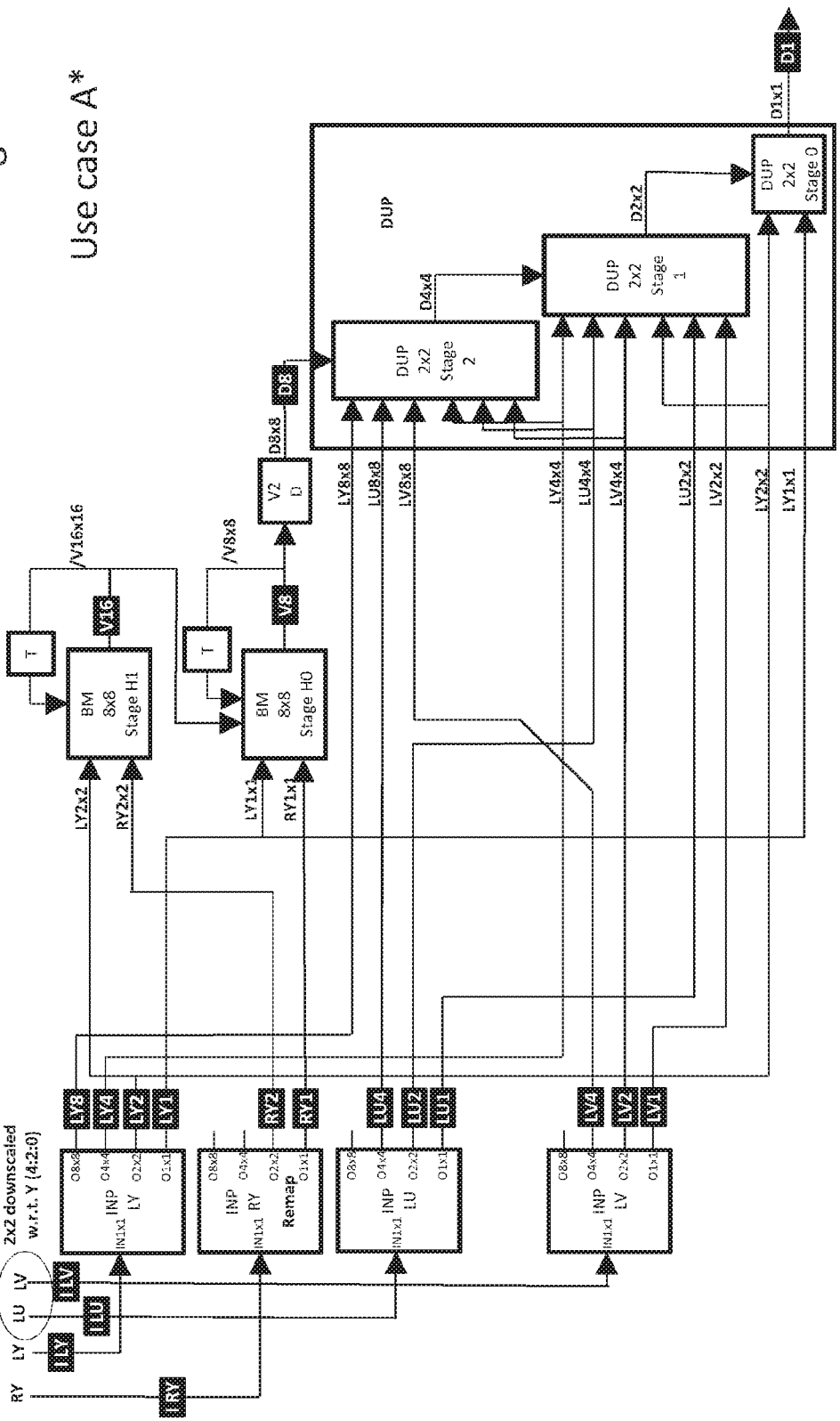

FIG. 17 illustrates a use-case A* in which the unscaled video data is obtained, if needed, from the 1×1 output of the input processing circuit. For that purpose, separate output buffers are allocated in the shared memory, being in this example buffers for LY1, LU1 and LV1. Rather than using the input buffers ILY, ILU and ILV, the functional blocks instead use the allocated output buffers from the 1×1 output of the input processing circuit. This way, once the input processing circuit has processed all data components, the input buffers are not needed anymore since the subsequent block matching and depth upscaling only relies on the video data in the output buffers of the input processing circuit. This facilitates design abstraction and separation of concerns, as the input buffers do not have to be allocated for a prolonged period anymore. FIG. 18 again summaries the configuration of the input processing circuit for each of the use-cases A and A*, indicating which outputs are selected for which use-case and for each data component within the respective use-case.

It will be appreciated that the additional data copy operations of the 1×1 buffers in use-case A* may add system cost in terms of additional bandwidth and power consumption. So the option to choose between use-case A and A* enables a design trade-off between hardware resource use (bandwidth and power consumption) and complexity of the buffer management. One may, e.g., integrate this IP block in a mains-powered device and opt for the less complex buffer management. Alternatively, in a battery-powered device, one may be prepared to spend the additional design effort in more complex buffer management to save power consumption and this extend battery life.

FIG. 19 shows a basic schedule 300 of operations for real-time conversion of stereoscopic video data. Here and in the following schedules, the horizontal axis corresponds to the time axis, with a particular input image being labeled N and N+1 representing a following input image. The RTC IP block, when configured to operate in stereo mode, uses the input processing, block matching and depth upscaling hardware circuits, as indicated with their respective abbreviations along the vertical axis of the time schedule. For the depth estimation, only the luminance component of the left- and right-hand images is used. In FIG. 19, the input processing circuit is shown to process the components of the input images consecutively, namely first the luminance component of the left image LY, then luminance component of the right image RY, and then chrominance components of the left image LU, LV. The sequential processing of the components reduces the overall latency of the real-time conversion, as explained onwards with continued reference to FIG. 19.

The input processing circuit may, in addition to downscaling or the simple copying to release the input buffer "outside" the RTC IP block, also perform functions such as luminance matching, e.g., to compensate for slight differences in brightness between left- and right-hand images as there may be subtle differences in optics or sensor sensitivity of the left- and right-hand camera sensors. The block matching circuit may be activated when the input processing circuit completes the processing of the luminance components of both the left and right-hand image of the input images. The block matching circuit may then return the depth information, e.g. in the form of a disparity field or a depth map.

It is noted that, in general, the depth estimation provides depth data which includes values which are indicative of the distance that objects have towards a camera, or viewer or display. The values may be depth values, which may be arranged in the form of a depth map, i.e., an image-like arrangement of depth values. Alternatively, the depth estimation may yield depth data which includes disparity values or parallactic shift values. Disparity values and parallactic shift values have an approximately inverse relation to depth values, and thus are indicative of the distances that objects have towards a camera, or viewer or display but do not directly correspond to the distances. Device and methods for conversion between all of the above types of signals are known.

The disparity estimation may be carried out using block matching on 8×8 pixel blocks. Here, the term 'block matching' refers to the block-wise searching of corresponding image content in the left and right images. It is noted that block matching is known per se from the field of motion estimation, and may be used for disparity estimation as the displacements between the left and right images are similar to motion between time-consecutive images. As a result, a disparity vector may be available for each 8×8 pixel block in the image. The x-component of the vector may be considered a measure for depth. The depth upscaling circuit may then stepwise refine the 8×8 depth map into a 4×4 depth map, a 2×2 depth map and finally a depth map at the pixel grid, i.e., 1×1. On each step, lower and higher resolution image data may be used. For that purpose, a hierarchy of downscaled images may be created by the input processing circuit, e.g., by simply repeatedly downscaling the input image by horizontal and vertical factors of 2.

In the schedule of FIG. 19, it can be seen that once the luminance components of the left image and right image LY, RY have been processed by the input processing circuit, the block matching circuit already starts, i.e., without waiting for the input processing of the chrominance components LU and LV to complete. As such, the block matching already starts before the input processing of an image pair has been fully completed. When the depth upscaling starts, e.g., upon availability of the depth information, the chrominance components are also available and can be used in the depth upscaling of the depth map. The schedule of FIG. 19 thus obtains a latency reduction compared to the scenario where the input processing circuit were to process the entire input image data first, i.e., including the chrominance components, and only then commence block matching.

FIG. 20 shows a more advanced schedule 310 of operations for real-time conversion of stereoscopic video data. Here, the IP-CPU is shown to perform some intermediate processing, labelled as "A" and "B". The processing "A" depends only on the left input image. This processing may involve, e.g., an analysis of the input sequence, and the adaptation of the subsequent processing in accordance with the result of the analysis. For example, processing "A" may involve applying a shot-cut detector, with parameter settings of subsequent processing steps depending on the output of the shot-cut detector. For example, immediately after a shot-cut, the disparity field may be re-initialized, as such a disparity field may be used temporally-recursive which is meaningless at a shot-cut. Also other temporal-recursive filters may be readjusted. Processing step "B" may involve, e.g., converting the disparity field of the block matching circuit into a depth map. Such a conversion may depend on the available depth range of the display, the measured disparity range in the disparity field and/or heuristics. It has been found that temporal filtering aids in stabilizing the depth map. Generally, it is likely that further algorithmic innovation occurs in this area. Therefore, the flexibility of a software implementation, as provided by the implementation on the IP-CPU, is beneficial for such a function. As a further example, a spatio-temporal filtering may be applied to the depth map for improved stabilization and quality. As such processing is running at the 8×8 block size, the amount of data is acceptable for a software implementation, which provides flexibility and allows late algorithmic design modifications, e.g., even after product introduction when in-field firmware upgrades are supported.

As is the case with the schedule of FIG. 19, the schedule of FIG. 20 has been latency reduced by the luminance data component being spatially downscaled before the chrominance data component, and the further processing, e.g., by the IP-CPU and the block matching circuit, starting upon after availability of the desired input data. A latency reduction is thus obtained over the scenario where the input processing circuit were to process the entire input image data first, including the chrominance components, and only then further processing of the input image data would start.

Figure 21:
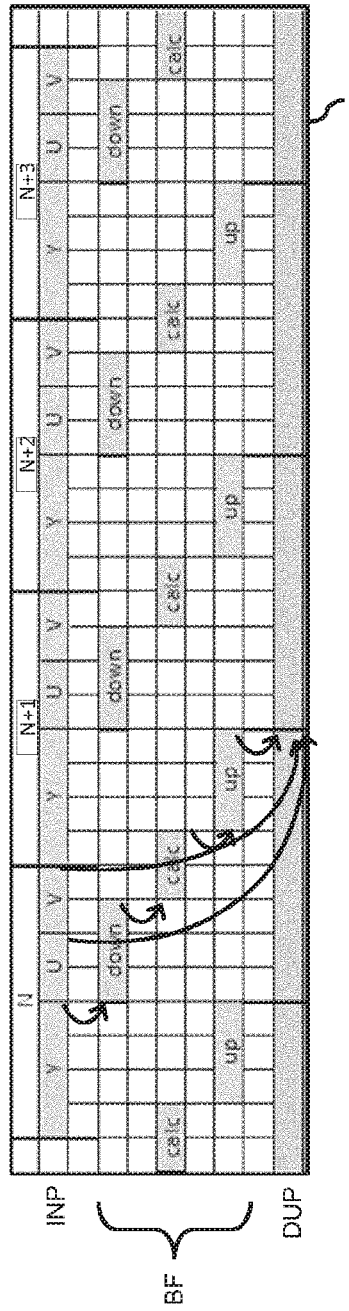
FIG. 21 shows a schedule for real-time conversion of monoscopic video data.

FIG. 21 shows a basic schedule 320 of operations for real-time conversion of monoscopic video data. In this example, the 2D depth estimator is based on an implementation of a joint bilateral filter. Such a joint bilateral filter may be used to adapt a generic depth profile to actual image contents, as described in U.S. Pat. No. 8,447,141 B2 with reference to, amongst others, FIG. 1. Furthermore, a fast implementation of such a filter is described in the publication "A fast approximation of the bilateral filter using a signal processing approach" by Paris et al., International Journal of Computer Vision 81.1 (2009): 24-52. The fast implementation is resource efficient and thus in the following assumed to implement the joint bilateral filter (henceforth also simply referred to "fast bilateral filter").

The RTC IP block, when configured to operate in 2D mode, may use the input processing, fast bilateral filter and depth upscaling hardware circuits, as indicated along the vertical axis of the time schedule. It has been found that it is beneficial to execute the fast bilateral filter on a significantly downscaled input signal. Therefore, the input processing circuit may create horizontally and vertically downscaled images which are scaled down, e.g., by a factor of 4. As a result, the depth map from the BF circuit is to be upscaled by 4×4. This may be achieved by the depth upscaling circuit in two steps. Namely, the depth upscaling circuit may use downscaled input images to help refining the depth map from 4×4 resolution in two steps to 2×2 and finally 1×1 pixel resolution. The downscaled images at 4×4 resolution and 2×2 resolution may be created by the input processing circuit.

The fast bilateral filter may involve three main processing steps: a downscaling (i.e., downsampling) step, a calculation step including a convolution, and an upscaling (i.e., upsampling) step, as described in the aforementioned paper "A fast approximation of the bilateral filter using a signal processing approach" by Paris et al., in particular in Section 4 thereof, which is summarized by equations 12a-12c of Section 4.1 and FIG. 2. In the latter Figure, the downsampling step may correspond to algorithm step 3, the calculation step to algorithm step 4, and the upsampling step to algorithm step 5. The downsampling may take 2D input data (X,Y) and convert it to a 3-dimensional space (X, Y, I), with (X,Y) reflecting the normal image dimensions and (I) reflecting an intensity dimension. This 3-dimensional volume representation of the data enables linear operations and substantial reduction of the data by downsampling the volume grid. In the described SoC, the downscaling step (labeled 'down' in FIG. 21 and following) is performed by the FBF hardware circuit. Subsequently, the calculation step (labeled 'calc') may be performed, e.g., by the FBF hardware circuit or in software by the IP-CPU. The upsampling of the 3-dimensional volume into a 2D depth map representation (labeled 'up') may then again be performed by the FBF hardware circuit.

These processing steps result in a schedule as shown in FIG. 21. Since the fast bilateral filter is applied to the luminance component Y only, its processing can already start at the moment in time that the input processing circuit has downscaled the luminance component Y. As previously discussed, the fast bilateral filter involves three steps: downsampling using the FBF hardware circuit, non-linear calculations performed by the IP-CPU, and an upsampling using again the FBF hardware circuit. Finally, the depth map is upsampled using the depth upscaling circuit to the input resolution, with the upsampling also using the chrominance components of the input image, i.e., U and V.

Figure 22:
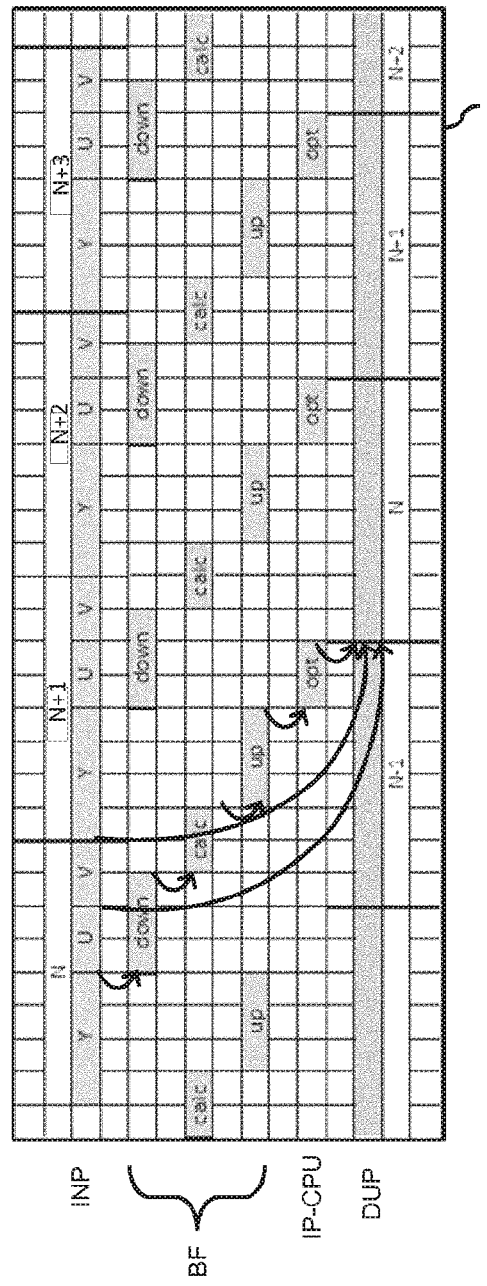
FIG. 22 shows another schedule for real-time conversion of monoscopic video data.

FIG. 22 shows another schedule 330 for real-time conversion of monoscopic video data, namely a more advanced example. Here, an additional optimization step "opt" is inserted before the depth upsampling using the depth upscaling circuit, with the additional optimization step being performed using the IP-CPU. This optimization step may involve depth map filtering, depth range adaptation, etc. In this example, the optimization step depends only on the fast bilateral filter upsampled output, but it might also use the input luminance component Y. As can be seen from the schedule, also the input chrominance components U and V are available and may be used by the IP-CPU.

It will be appreciated that, in general, the RTC IP block may be provided separately of the described SoC, e.g., in another type of SoC. For example, instead of the described SoC interfacing with an external memory, such a memory may be included in the SoC including the RTC IP block. Another example is that the SoC may include a rendering circuit for rendering views, e.g., for display on a multi-view 3D display, using the depth map generated by the RTC IP block.

Furthermore, data may be provided on a computer readable medium which defines the RTC IP block in the form of netlists and/or synthesizable RTL. The computer readable medium, and thereby the data stored thereon, may be transitory or non-transitory. For example, the RTC IP block may be provided as a synthesizable core, e.g., in a hardware description language such as Verilog or VHDL, or as generic gate-level netlists providing a boolean-algebra representation of the RTC IP block's logical function implemented as generic gates or process specific standard cells.

It will be appreciated that, in general, the described RTC IP block aims to provide an abstraction and/or separation of concerns between the "inside world" of the RTC IP block and the "outside world" of the SoC. For that purpose, detailed control of the circuits inside the RTC IP block may be provided, in that the circuits may be highly configurable. The circuits may then be configured by one or more signal analysis functions running on the IP-CPU, which may run at lower resolution and thus have limited computational complexity. As output, configuration data may be generated to properly set the circuit's parameters, thereby configuring the input processing circuit, the depth upscaling circuit, etc.

It will further be appreciated that in at least some embodiments of the SoC, the input processing (downscaling) may be executed time-sequential over the components of the input signal. First, the luminance component may be processed to make this available as early as possible for subsequent processing. After the luminance component, the chrominance components may be processed. Since there is intermediate processing based on luminance only, this schedule facilitates start of the intermediate processing as early as possible. In later processing stages, also the downscaled chrominance components may be used. By the time that the intermediate processing is completed, the input has also completed the downscaled chrominance components. As a result, the total latency of the processing may be reduced, and the sequential processing of the components promotes re-use of the same hardware.

It is noted that in the above, the term map refers to data arranged in rows and columns. Moreover, the adjective depth is to be understood as being indicative of the depth of portions of an image to the camera. Therefore, the depth map may be constituted by depth values, but also by, e.g., disparity values or parallactic shift values. Essentially, the depth map may therefore constitute a disparity map or a parallactic shift map. Here, the term disparity refers to a difference in position of an object when perceived with a left eye or a right eye of the user. The term parallactic shift refers to a displacement of the object between two views so as to provide the disparity to the user. Disparity and parallactic shift are generally negatively correlated with distance or depth. Device and methods for conversion between all of the above types of maps and/or values are known.

Further embodiments are described in the following clauses.

Clause 1. A system-on-chip configured for latency-reduced real-time depth estimation of video data, the system-on-chip including a plurality of circuits and a memory interface for enabling direct memory access to a shared memory, the plurality of circuits including:
  an input processing circuit configured for:
    spatially downscaling the video data to obtain downscaled video data, and
    storing the downscaled video data in the shared memory;
  a depth estimator circuit configured for:
    accessing the downscaled video data,
    estimating depth from the downscaled video data, thereby obtaining depth data having a spatial resolution lower than the spatial resolution of the video data, and
    storing the depth data in the shared memory; a depth upscaling circuit configured:
    accessing the depth data and the downscaled video data, and
    upscaling the depth data using the downscaled video data; and wherein:
  the depth estimator circuit is configured for estimating the depth from a luminance data component of the downscaled video data;
  the depth upscaling circuit is configured for upscaling the depth data using a chrominance data component of the downscaled video data; and
  the input processing circuit is configured for time multiplexing the spatially downscaling of the video data, the time multiplexing including, for each input image or stereo input image pair of the video data, spatially downscaling the luminance data component before spatially downscaling the chrominance data component.

Clause 2. The system-on-chip according to clause 1, wherein:
  the system-on-chip further includes an image processing circuit configured for analyzing the video data, wherein the image processing circuit configured to, when the video data is stereoscopic-type video data including a sequence of image pairs, analyze a first image of a respective image pair to obtain analysis data for use in the depth estimation; and
    the input processing circuit is configured for downscaling the first image of the image pair before downscaling the second image of the image pair.

For example, the image processing circuit may be represented by the embedded CPU core programmed to perform the image analysis.

Clause 3. The system-on-chip according to clause 2, wherein the image processing circuit is configured for performing a shot-cut detection.

Clause 4. The system-on-chip according to clause 2 or 3, wherein the first image of the respective image pair is the left image.

Clause 5. A system-on-chip configured for real-time depth estimation of video data, the system-on-chip including:
  a monoscopic depth estimator configured to perform monoscopic depth estimation from monoscopic-type video data;
  a stereoscopic depth estimator configured to perform stereoscopic depth estimation from stereoscopic-type video data;
  a memory interface for enabling direct memory access to a shared memory;
  wherein the system-on-chip is reconfigurable to perform either the monoscopic depth estimation or the stereoscopic depth estimation on the basis of configuration data defining the selected depth estimation mode, wherein the monoscopic depth estimator and the stereoscopic depth estimator include:
    a reconfigurable shared input processing circuit reconfigurable by the configuration data to:
      differently spatially downscale the video data in accordance with the selected depth estimation mode to obtain downscaled video data, and
      store the downscaled video data in the shared memory;
    each separately, a depth estimator core circuit configured to:
      access the video data or the downscaled video data,
      estimate depth data from the accessed video data, the depth data having a spatial resolution lower than the spatial resolution of the video data, and
      store the depth data in the shared memory;
    a reconfigurable shared depth upscaling circuit reconfigurable by the configuration data to:
      access the depth data and the downscaled video data, and
      differently upscale the depth data using the downscaled video data in accordance with the selected depth estimation mode.

It should be noted that the above-mentioned embodiments illustrate rather than limit the presently disclosed subject matter, and that those of ordinary skill in the art will be able to design many alternative embodiments.

In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. Some embodiments may be implemented by hardware including several distinct elements, and by a suitably programmed computer. In the device claim enumerating several methods, several of these methods may be embodied by one and the same item of hardware. The mere fact that certain measures are recited in mutually different dependent claims does not indicate that a combination of these measures cannot be used to advantage.

The invention claimed is:
1. A system-on-chip configured for real-time depth estimation of video data, the system-on-chip comprising:

a monoscopic depth estimator configured to perform monoscopic depth estimation from monoscopic-type video data;

a stereoscopic depth estimator configured to perform stereoscopic depth estimation from stereoscopic-type video data;

a memory interface for enabling direct memory access to a shared memory, such that the system-on-chip is reconfigurable to perform either the monoscopic depth estimation or the stereoscopic depth estimation on the basis of configuration data defining the selected depth estimation mode, wherein the monoscopic depth estimator and the stereoscopic depth estimator include:

a reconfigurable shared input processing circuit instantiated in hardware and reconfigurable by the configuration data to:

generate an hierarchy of downscaled images for each input image of the video data by spatially downscaling the input image in accordance with a plurality of downscale factors, wherein the input processing circuit is configurable by the configuration data to select a different subset of the hierarchy of downscaled images to be output for the stereoscopic depth estimation than for the monoscopic depth estimation to obtain downscaled video data specific to the selected depth estimation mode, and store the downscaled video data in the shared memory;

each separately, a depth estimator core circuit instantiated in hardware and configured to:

access the video data or the downscaled video data, estimate depth data from the accessed video data, the depth data having a spatial resolution lower than the spatial resolution of the video data, and store the depth data in the shared memory;

a reconfigurable shared depth upscaling circuit instantiated in hardware and reconfigurable by the configuration data to:

access the depth data and the downscaled video data, and upscale the depth data in successive steps using the downscaled video data, wherein the depth upscaling circuit is configurable by the configuration data to use different successive steps for the stereoscopic depth estimation than for the monoscopic depth estimation in accordance with the selected depth estimation mode, wherein the input processing circuit is configurable by the configuration data to:

for monoscopic depth estimation, generate the non-scaled version of the input image as a direct copy of the input image; and for stereoscopic depth estimation, generate the non-scaled version of the input image by applying a histogram adjustment to the input image to obtain a non-scaled and histogram-adjusted version of the input image.

2. The system-on-chip according to claim 1, wherein the depth estimator core circuit of the monoscopic depth estimator implements a joint bilateral filter which, when applied to an image of the video data or the downscaled video data, provides a depth map as output.

3. The system-on-chip according to claim 1, wherein the depth estimator core circuit of the stereoscopic depth estimator implements a block matcher which, when applied to a stereo image pair of the video data or the downscaled video data, provides a depth map as output.

4. The system-on-chip according to claim 1, wherein the input processing circuit is configurable by the configuration data to, in addition to generating the hierarchy of downscaled images for each input image, further output a non-scaled version of the input image, and to store the non-scaled version of the input image as separate video data from the original video data in the shared memory.

5. The system-on-chip according to claim 4, wherein each depth estimator core circuit is configured to, when using the non-scaled version of the input image to estimate the depth data, use the separate video data instead of the original video data.

6. The system-on-chip according to claim 1, configured for latency-reduced real-time depth estimation of video data, wherein:

each depth estimator core circuit is configured for estimating the depth data from a luminance data component of the downscaled video data;

the depth upscaling circuit is configured for upscaling the depth data using a chrominance data component of the downscaled video data; and the input processing circuit is configured for time multiplexing the spatially downscaling of the video data, the time multiplexing comprising, for each input image or stereo input image pair of the video data, spatially downscaling the luminance data component before spatially downscaling the chrominance data component.

7. The system-on-chip according to claim 6, wherein the depth upscaling circuit is configured to upscale the depth data using a joint bilateral filter, wherein range properties of the joint bilateral filter are derived from the chrominance data component of the downscaled video data.

8. The system-on-chip according to claim 1, wherein at least one of: the spatial downscaling the video data and the upscaling of the depth data, is performed in one or a number of repeated steps of 2×2 scaling.

9. The system-on-chip according to claim 2, wherein the depth estimator core circuit of the stereoscopic depth estimator implements a block matcher which, when applied to a stereo image pair of the video data or the downscaled video data, provides a depth map as output.

10. The system-on-chip according to claim 2, wherein the input processing circuit is configurable by the configuration data to, in addition to generating the hierarchy of downscaled images for each input image, further output a non-scaled version of the input image, and to store the non-scaled version of the input image as separate video data from the original video data in the shared memory.

11. The system-on-chip according to claim 3, wherein the input processing circuit is configurable by the configuration data to, in addition to generating the hierarchy of downscaled images for each input image, further output a non-scaled version of the input image, and to store the non-scaled version of the input image as separate video data from the original video data in the shared memory.

12. The system-on-chip according to claim 2, configured for latency-reduced real-time depth estimation of video data, wherein:

each depth estimator core circuit is configured for estimating the depth data from a luminance data component of the downscaled video data;

the depth upscaling circuit is configured for upscaling the depth data using a chrominance data component of the downscaled video data; and the input processing circuit is configured for time multiplexing the spatially downscaling of the video data, the time multiplexing comprising, for each input image or stereo input image pair of the video data, spatially downscaling the luminance data component before spatially downscaling the chrominance data component.

13. The system-on-chip according to claim 3, configured for latency-reduced real-time depth estimation of video data, wherein:
- each depth estimator core circuit is configured for estimating the depth data from a luminance data component of the downscaled video data;
- the depth upscaling circuit is configured for upscaling the depth data using a chrominance data component of the downscaled video data; and
- the input processing circuit is configured for time multiplexing the spatially downscaling of the video data, the time multiplexing comprising, for each input image or stereo input image pair of the video data, spatially downscaling the luminance data component before spatially downscaling the chrominance data component.

14. The system-on-chip according to claim 4, configured for latency-reduced real-time depth estimation of video data, wherein:
- each depth estimator core circuit is configured for estimating the depth data from a luminance data component of the downscaled video data;
- the depth upscaling circuit is configured for upscaling the depth data using a chrominance data component of the downscaled video data; and
- the input processing circuit is configured for time multiplexing the spatially downscaling of the video data, the time multiplexing comprising, for each input image or stereo input image pair of the video data, spatially downscaling the luminance data component before spatially downscaling the chrominance data component.

15. The system-on-chip according to claim 5, configured for latency-reduced real-time depth estimation of video data, wherein:
- each depth estimator core circuit is configured for estimating the depth data from a luminance data component of the downscaled video data;
- the depth upscaling circuit is configured for upscaling the depth data using a chrominance data component of the downscaled video data; and
- the input processing circuit is configured for time multiplexing the spatially downscaling of the video data, the time multiplexing comprising, for each input image or stereo input image pair of the video data, spatially downscaling the luminance data component before spatially downscaling the chrominance data component.

16. The system-on-chip according to claim 2, wherein at least one of: the spatial downscaling the video data and the upscaling of the depth data, is performed in one or a number of repeated steps of 2×2 scaling.

17. The system-on-chip according to claim 3, wherein at least one of: the spatial downscaling the video data and the upscaling of the depth data, is performed in one or a number of repeated steps of 2×2 scaling.

18. The system-on-chip according to claim 4, wherein at least one of: the spatial downscaling the video data and the upscaling of the depth data, is performed in one or a number of repeated steps of 2×2 scaling.

* * * * *